United States Patent
Madabhushi

[19]

[11] Patent Number: 5,991,491
[45] Date of Patent: Nov. 23, 1999

[54] OPTICAL WAVEGUIDE TYPE DEVICE FOR REDUCING MICROWAVE ATTENUATION

[75] Inventor: Rangaraj Madabhushi, Tokyo, Japan

[73] Assignee: NEC Corporation, Tokyo, Japan

[21] Appl. No.: 08/966,698

[22] Filed: Nov. 10, 1997

[30] Foreign Application Priority Data

Nov. 8, 1996 [JP] Japan .................................. 8-296715
Jan. 9, 1997 [JP] Japan .................................. 9-001962

[51] Int. Cl.$^6$ ...................................................... G02B 6/10
[52] U.S. Cl. .................................. 385/131; 385/2; 385/8
[58] Field of Search .................................. 385/1–4, 8, 9, 385/14, 31, 40, 129–131

[56] References Cited

U.S. PATENT DOCUMENTS

| | | | |
|---|---|---|---|
| 5,214,724 | 5/1993 | Seino et al. | 385/2 |
| 5,416,859 | 5/1995 | Burns et al. | 385/3 |
| 5,502,780 | 3/1996 | Madabhushi | 385/3 |
| 5,801,871 | 9/1998 | Madabhushi | 359/245 |

FOREIGN PATENT DOCUMENTS

| | | |
|---|---|---|
| 3-503809 | 8/1991 | Japan . |
| 4-110804 | 4/1992 | Japan . |
| 5-93892 | 4/1993 | Japan . |
| 5-509415 | 12/1993 | Japan . |
| 6-300994 | 10/1994 | Japan . |
| 7-98442 | 4/1995 | Japan . |
| 7-261135 | 10/1995 | Japan . |

OTHER PUBLICATIONS

Kawano et al, New Travelling–Wave Electrode Mach–Zehnder Optical Modulator with 20GH$_z$ Bandwidth and 4–7V Driving Voltage at 1–52$\mu$m Wavelength, Electronics Letters, Vo. 25, No. 20, pp. 1382–1383, Sep. 1989.

Japanese Office Action Dated Jun. 10, 1998 with English language translation of Japanese Examiner's comments.

M. Rangaraj, et al. "A Wide–Band Ti:LiNbO$_3$ Optical Modulator with a Conventional Coplanar Waveguide Type Electrode", IEEE Photonics Technology Letters, vol. 4, No. 9, Sep. 1992.

M. Rangaraj et al. "A Wide–Band Ti:LiNbO$_3$ Optical Modulator with a Novel Low–Microwave Attenuation CPW Electrode Structure", pp. 104–105 No date given.

Primary Examiner—John D. Lee
Assistant Examiner—Juliana K. Kang
Attorney, Agent, or Firm—Whitham, Curtis & Whitham

[57] ABSTRACT

In an optical waveguide type device, an optical waveguide is formed in a crystal substrate having an electro-optical effect. A buffer layer is formed on the crystal substrate. Further, an signal electrode is formed on the buffer layer so that microwave signals are given to the signal electrode. In addition, a dielectric substrate is formed under the crystal substrate. With this structure, a groove is formed in the dielectric substrate and below at least the signal electrode. In this case, the groove functions as the air gap for reducing an attenuation of the microwave signals. According to this invention, the microwave attenuation is reduced and further the handling of the chip becomes easy. Alternatively, such a reduction can be accomplished by selecting a first width of an active portion of a signal electrode, a second width of a feeder portion of the signal electrode, and a third width of a connector. Specifically, the second width is wider than the first width and is narrower than the third width.

17 Claims, 22 Drawing Sheets

OPTICAL WAVEGUIDE TYPE DEVICE FOR REDUCING MICROWAVE ATTENUATION

BACKGROUND OF THE INVENTION

This invention relates to an optical waveguide type device for use as an optical modulator or switch in various optical systems, such as a high-speed optical communication, an optical switching network, an optical information processing and an optical image processing.

Optical waveguide type devices such as optical waveguide modulators and switches are the most important key elements for realizing a high-speed optical communication, an optical switching network, an optical information processing and an optical image processing. The waveguide type optical device utilizes a electro-optical effect having a high operation speed, since the device is required to operate at a super high-speed and a low driving power. The electro-optical effect means such a phenomenon that the index of refraction of a substance is changed by applying an electrical field for the substance. Heretofore, various waveguide type optical devices have been developed by the use of the above electro-optical effect. For example, the above optical waveguide modulator comprises an optical waveguide formed in a substrate having the electro-optical effect and a signal electrode formed on the substrate via a buffer layer. A $LiNbO_3$ substrate or a GaAs substrate is used as the substrate in many cases. Where the $LiNbO_3$ is used as the substrate, the optical waveguide is formed by thermally diffusing titanium (Ti) into the $LiNbO_3$ substrate. This diffusion method of titanium provides a convenient and simple method of fabricating a low-loss strip waveguide having excellent electro-optical properties.

Important parameters of the optical waveguide modulator are a driving power (a driving voltage), a modulation bandwidth, a characteristic impedance and an insertion loss. In this case, the driving power and the modulation bandwidth are in a trade-off relationship. Namely, it is difficult to satisfy both a wide modulation bandwidth and a low driving power at the same time. Therefore, researches of the optical waveguide modulator has been concentrated on optimizing the trade-off relationship.

The modulation bandwidth of the optical waveguide modulator is limited by a microwave attenuation and a velocity mismatch between an optical wave and a microwave. In addition, the modulation bandwidth depends on a type, a material and an arrangement of an electrode and a dielectric constant of the substrate. For broadband applications, a travel-wave electrode is widely used. The concept of the traveling-wave electrodes is that the traveling-wave electrodes are made extensions of a driving transmission line. Thus, the electrode should have a characteristic impedance which is equal to that of a power source and a cable. In this event, a modulation speed is limited by a difference in transit time (a phase velocity or an effective index) between the optical wave and the microwave. The travelling wave electrode has two types of structures, namely, an ASL (Asymmetric Strip Line) or ACPS (Asymmetric Coplanar Strip) electrode structure and a CPW (Coplanar Waveguide) electrode structure.

The microwave attenuation is very important in the sense that, even if a perfect velocity matching is obtained, the bandwidth is limited by the microwave attenuation. Hence, reduction of the microwave attenuation is needed.

The microwave attenuation is caused by,
(a) Stripline conductor loss, which is a function of the electrode arrangement, resistivity of the electrode material and a parameter of the buffer layer etc.,
(b) Dielectric loss, which is a function of the dielectric constant and tanδ (loss tangent) of the $LiNbO_3$ substrate etc.,
(c) Loss due to higher order mode propagation,
(d) Loss due to stripline bends and tapers,
(e) Loss due to impedance mismatch with a 50Ω source and a load,
(f) Loss due to a mounting package including loss at a connector, a connector-stripline (signal electrode) contact and an outside package.

Inventors have tried to reducing the microwave attenuation by reducing the above mentioned factors, especially concentrating on the stripline conductor loss and the higher order mode propagation. The inventors have achieved an optical modulator having a wide bandwidth and a relatively low driving voltage by using a thick buffer layer and a thick electrode structure. This is given in paper "A wide-band Ti:$LiNb_3$ optical modulator with a conventional coplanar waveguide type electrode", IEEE Photonics Technology Letters, vol.4, No.9, pp. 1020–022, 1992. The inventors have achieved a bandwidth of 20 GHz and a driving voltage of 5 V for an electrode length of 2.5 cm. Herein, the higher order mode propagation loss is reduced by decreasing the chip thickness to about 0.2 mm.

In addition, a fiber/fiber connecter having a proper package must be attached to an edge of the chip in a practical use. The chip thickness (or the surface area) at the edge should be the order of few millimeter at a cross section to facilitate the fiber connection. Hence, the chip is usually arranged on a dielectric substrate such as a glass substrate. In this case, the dielectric substrate has thermal characteristics (thermal expansion etc.) compatible with that of the $LiNbO_3$ substrate to obtain a desired thickness at the edge in the practical device. This dielectric substrate also helps in providing strength to the thin $LiNbO_3$ chip (the thickness of about 0.2 mm). Further, the chip and the dielectric substrate may be placed in a metal package to obtain both stability and reliability of the operation.

Subsequently, the conventional optical waveguide modulator will be explained in more detail.

First, an optical waveguide is formed in a substrate such as a $LiNbO_3$ substrate. The substrate is arranged on a dielectric substrate such as a glass substrate. Further, the dielectric substrate is disposed on a metal substrate. The optical waveguide is formed by thermally diffusing titanium (Ti) into the substrate. Subsequently, a buffer layer is entirely formed on the substrate to cover the optical waveguide. Next, a CPW (Coplanar Waveguide) electrode structure having one signal electrode and two ground electrodes is formed thereon. In addition, a fiber/fiber package are attached to the both sides of the substrate so that the optical wave goes in and out of the optical waveguide. Further, a connector/connector package is attached to the signal electrode. Under this circumstances, microwave signals are given to the signal electrode via the connector. Finally, the substrate is placed in a metal package.

In this case, loss due to higher order mode propagation becomes a problem. The thickness of the chip must be ideally reduced in the range of not greater than 0.2 mm, and further air gaps must be provided up and down the chip to reduce the microwave attenuation due to the higher order mode propagation. However, it is difficult to handle the chip with such a structure and further attach the fiber/fiber connector for such a thin chip. Therefore, the chip is arranged on the dielectric substrate, as mentioned above. However, the microwave attenuation is increased because the device has no air gaps.

To the solve the problem, suggestion has been made about a device which comprises the dielectric substrate and which has a slit structure therein for the entire portion except for edge portions to reduce the microwave attenuation by the inventors, as disclosed in U.S. Pat. No. 5,502,780. However, it is also difficult to handle the device because the dielectric substrate has the above slit structure.

On the other hand, a wider modulation bandwidth (higher than 20 GHz) and a lower driving voltage (lower than 3.5 V) are needed to realize further higher speed communication system. To this end, the microwave attenuation must further be reduced. As above mentioned, the bandwidth of the optical modulator is restricted by the microwave attenuation. It has been experimentally confirmed that the loss of the microwave mainly depends on a feeder portion of a signal electrode, a connection between a connector and the signal electrode and a connector package and the like. Generally speaking, the characteristic impedance, the velocity mismatch between the optical wave and the microwave or the difference of the effective index of refraction can be set to a desired value by optimizing electrode parameters, such as the width of the signal electrode, the gap between the signal electrode and the ground electrode, and a parameter of the buffer layer.

The stripline conductor loss as a part of the microwave attenuation of the electrode is also determined by the electrode parameters. For example, disclosure has been made about an impedance matching circuit for matching impedance between the signal electrode and the connector in Unexamined Japanese Patent Publication No. H7-98442. However, it is expected that the microwave loss is increased by the impedance matching circuit.

By the way, the width of the signal electrode generally falls within the range between 5 and 10 $\mu$m, while the gap between the signal electrode and the ground electrode falls within the range between 10 and 30 $\mu$m. This is given in paper "A wide-band Ti:LiNbO$_3$ optical modulator with a novel low-microwave attenuation CPW electrode structure", Proceedings of IOOC-95, WD1–3, 1995. Further, the width of the connector generally falls within the range between 0.22 and 0.5 mm.

It is ideal that the width of the signal electrode is made constant and further equal to that of the connector so as to reduce the microwave loss. However, the width of the connector in the practical use falls within the range 0.22 and 0.5 mm, while the width of the signal electrode generally falls within the range between 5 and 10 $\mu$m. Therefore, the feeder portion of the signal electrode must be widen in a taper form to connect the signal electrode with the connector. Consequently, the microwave loss is increased.

SUMMARY OF THE INVENTION

It is an object of this invention to provide an optical waveguide type device which is capable of reducing a microwave attenuation.

Inventors have found out that the microwave attenuation can be sufficiently reduced even if an air gap is provided only under a signal electrode instead of the entire chip. In accordance with the above knowledge, the air gap is provided in a dielectric substrate (or a metal substrate) under the signal electrode.

Concretely, an optical waveguide is formed in a crystal substrate having an electro-optical effect. A buffer layer is formed on the crystal substrate. Further, an signal electrode is formed on the buffer layer so that microwave signals are given to the signal electrode. In addition, a dielectric substrate is formed under the crystal substrate. With this structure, a groove is formed in the dielectric substrate and below at least the signal electrode. In this case, the groove functions as the air gap for reducing an attenuation of the microwave signals. According to this invention, the microwave attenuation is reduced and further the handling of the chip becomes easy.

On the other hand, according to this invention, a relation among a first width of an active portion of a signal electrode, a second width of a feeder portion of the signal electrode and a third width of a connector is specified as follows so as to reduce the microwave attenuation. Namely, the second width is wider than the first width and is narrower than the third width.

DESCRIPTION OF THE PREFERRED EMBODIMENTS

Figure 1A:
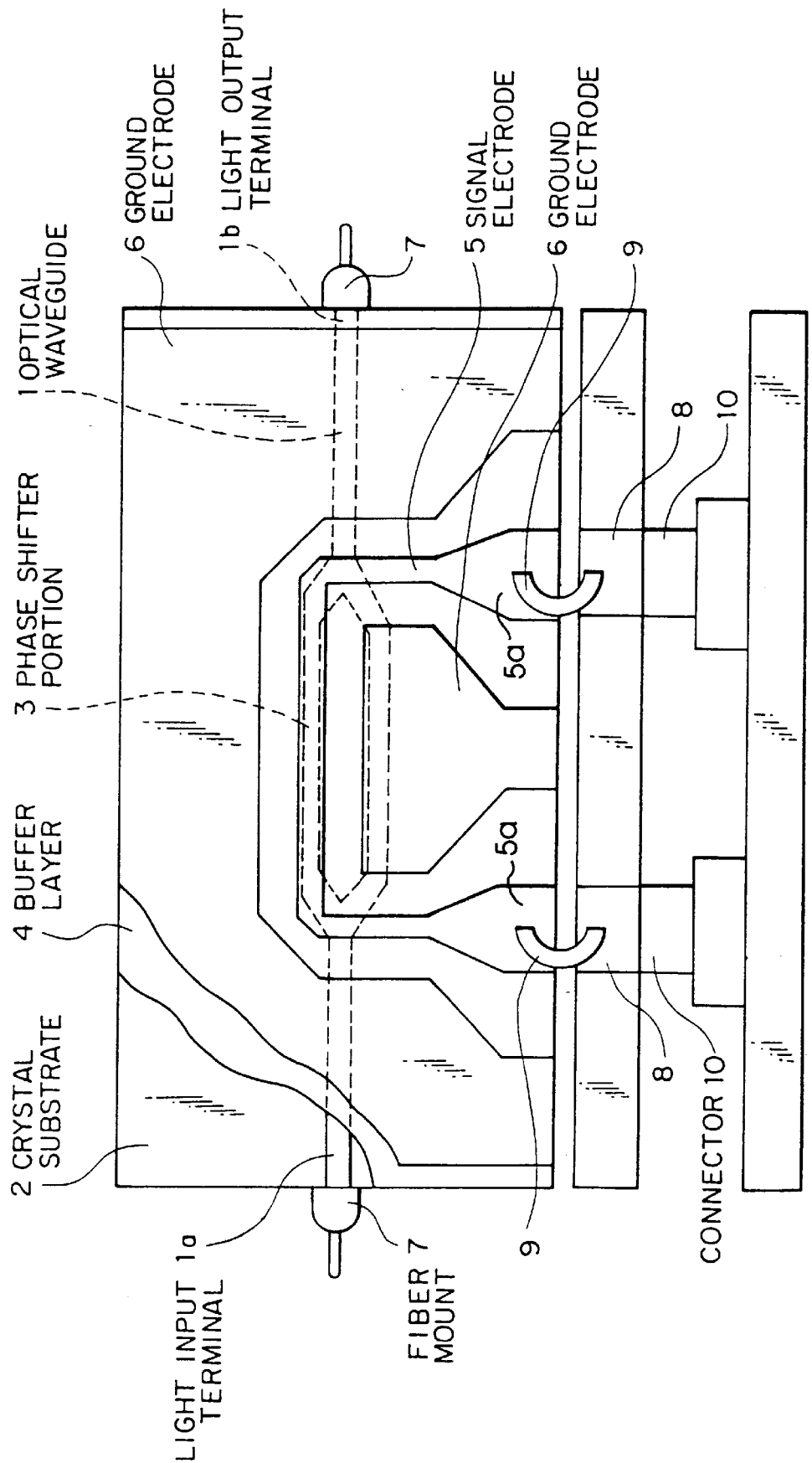
FIG. 1A is a partially sectional plan view showing a conventional optical waveguide type device.

Referring to FIG. 1, a conventional optical waveguide type device (an optical waveguide modulator) will first be described for a better understanding of this invention. The optical waveguide type device is equivalent to the conventional optical waveguide type device in the preamble of the instant specification.

An optical waveguide 1 is formed in a crystal substrate 2 (such as a LiNbO$^3$ substrate) having an electro-optical effect by depositing a titanium metal film strip and diffusing titanium into the crystal substrate 2. The optical waveguide 1 has a light input terminal 1a and a light output terminal 1b. Further, the optical waveguide 1 is branched into two paths in an intermediate portion. The intermediate portion functions as a phase shifter portion 3 of Mach-Zehnder interferometer type. A dielectric buffer layer 4 is entirely formed on the crystal substrate 2 to cover the optical waveguide 1. Further, a coplanar waveguide (CPW) electrode structure is formed on the buffer layer 4. The CPW electrode structure has one signal electrode 5 and two ground electrodes 6. Fiber mounts 7 are attached to the light input terminal 1a and the light output terminal 1b, respectively. The light goes in and out of the optical waveguide 1 via the fiber mounts 7. Further, outside ceramic stripline electrode structures 8 are connected to both end portions (feeder portions 5a) of the signal electrode 5 via Au wires 9. In addition, connectors 10 are attached to the outside ceramic stripline electrode structures 8 to supply microwave signals to the signal electrode 5. In this event, the width of the feeder portion 5a is equal to that of the connector 10 or larger. In this case, the connector 10 may be directly connected to the signal electrode 5 via the Au wires 9.

Figure 1B:
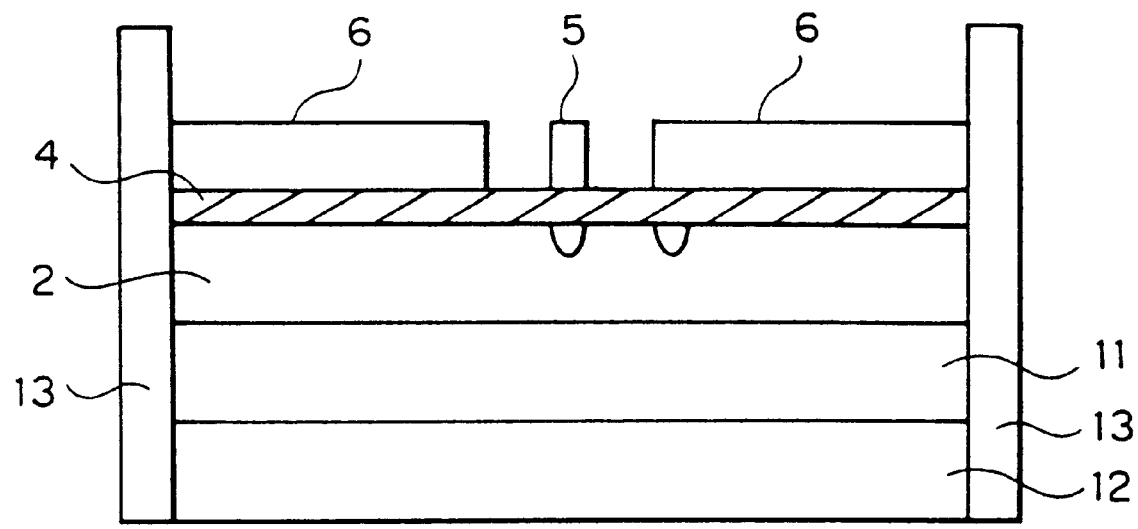
FIG. 1B is a cross sectional view showing a conventional optical waveguide type device.

A dielectric substrate 11 is arranged under the crystal substrate 2, as shown in FIG. 1B. Thereby, handling becomes easy, the strength is reinforced and further the attachment of the fiber becomes easy. In addition, a metal substrate 12 is provided under the dielectric substrate 11. Finally, the substrates 2, 11 and 12 are placed in a metal package 13, as shown in FIG. 1B.

With such a structure, an incident optical wave from the light input terminal 1a is branched into two optical waves and propagates through the phase shifter portion 3. Where no phase shift is given to the phase shifter portion 3, namely where no outside voltage is supplied to the signal electrode 5, the two optical waves are combined with the identical phase to propagate to the light output terminal 1b without weakness. On the other hand, where the phase shift of π is given to the phase shifter portion 3 by supplying the outside voltage, the two optical waves are cancel by interfering. Consequently, an output strength of the optical wave which is sent to the light output terminal 1b becomes a minimum level or zero. Thus, the application of the outside voltage leads an ON state or an OFF state of the optical wave. This state is considered as a switching or a modulation operation. That is, the device functions as an optical modulator of a high bandwidth by supplying a microwave signal of a high frequency.

Figure 2:
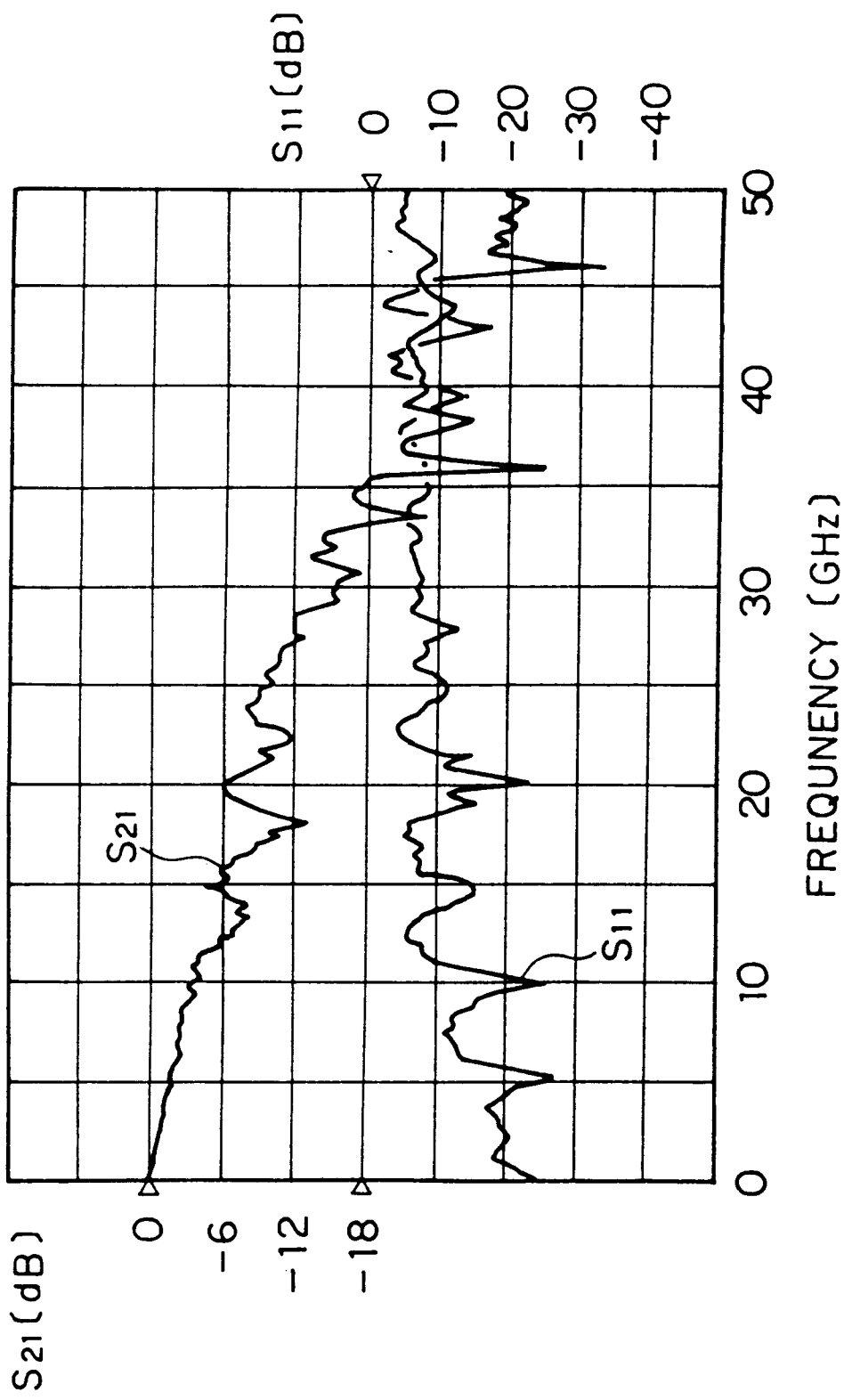
FIG. 2 shows an electric characteristics of a conventional optical waveguide type device.

As mentioned above, the bandwidth of the optical modulator is restricted by the microwave attenuation. In particular, the attenuation of the microwave which is given to the signal electrode 5 via the connector 10 tends to increase in a high frequency region. At the same time, the characteristic impedance is also changed in accordance with the frequency. FIG. 2 shows a measuring result of an electric characteristic (S parameter) of the conventional optical waveguide type device. In FIG. 2, the abscissa axis represents the frequency. The vertical axis at a lefthand side represents the attenuation $S_{21}$ of the microwave, while the vertical axis at a righthand side represents a reflection $S_{11}$ (indirectly, the characteristic impedance) of the microwave. The microwave attenuation is logically a function of the frequency. However, the microwave attenuation tends to largely decay irrelevant to the function when the frequency exceeds 10–15 GHz. On the other hand, the reflection of the microwave increases when the frequency is 5 GHz or more. It is experimentally confirmed that the loss of the microwave is mainly caused by the feeder portion 5a of the signal electrode 5, the connection between the connector 10 and the signal electrode 5 and the connector package 13.

In addition, no air gaps are provided under the crystal substrate in the conventional structure. Therefore, the microwave attenuation largely increases according to the conventional optical waveguide type device.

Taking the above-mentioned problems into consideration, this invention provides an optical waveguide type device which is capable of reducing the microwave attenuation.

First embodiment

Referring to FIGS. 3 to 6, an optical waveguide type device according to a first embodiment of this invention will be described below.

Figure 4:
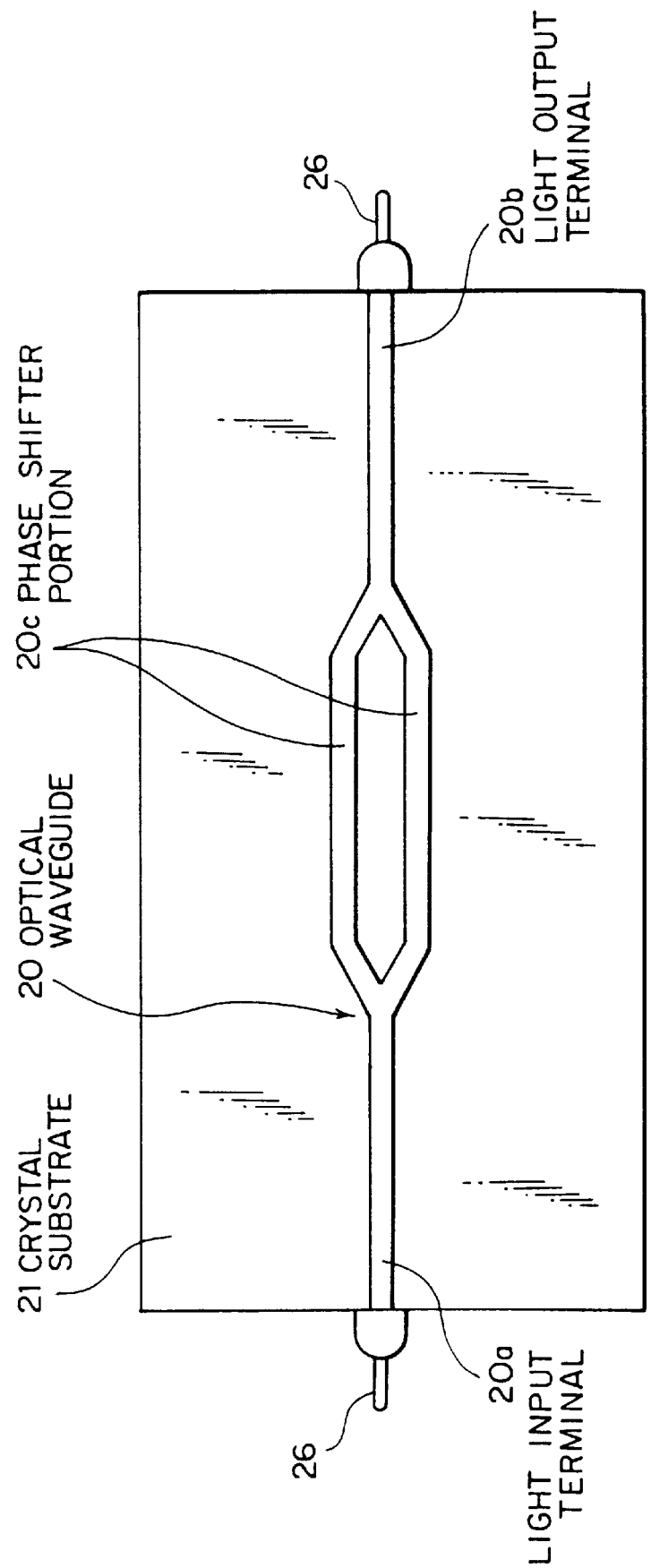
FIG. 4 is a plan view showing a structure of an optical waveguide in FIG. 3.
Figure 5:
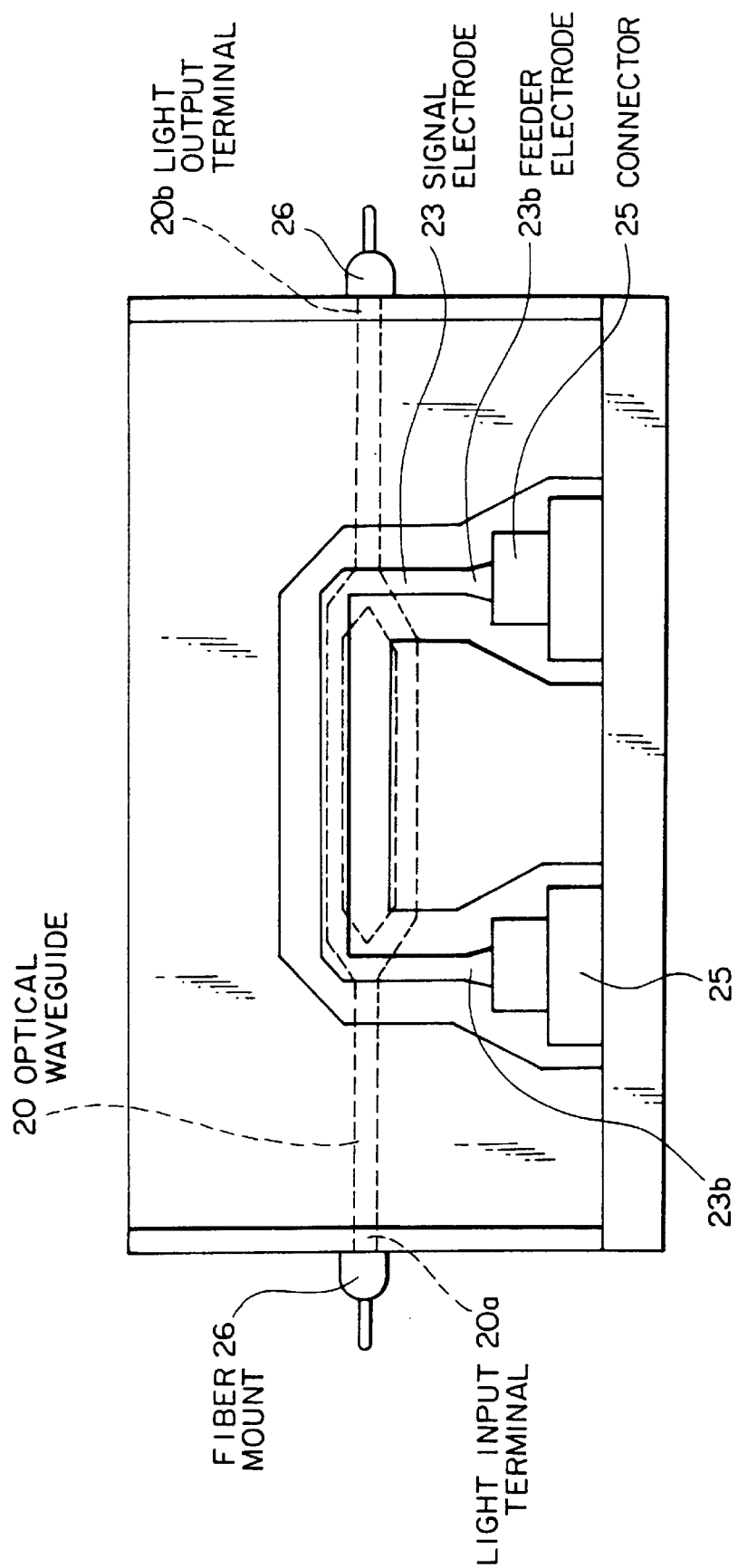
FIG. 5 is a plan view showing a condition that connectors are attached to the optical waveguide type device in FIG. 3.

An optical waveguide 20 is formed in a crystal substrate 21 (such as a LiNbO$^3$ substrate) having an electro-optical effect. A dielectric buffer layer 22 is entirely formed on the crystal substrate 21 to cover the optical waveguide 20. Further, a coplanar waveguide (CPW) type electrode structure is formed as a traveling wave electrode on the buffer layer 22. The CPW type electrode structure has one signal electrode 23 and two ground electrodes 24a and 24b. The optical waveguide 20 is formed as a metal strip from one terminal to another terminal on the crystal substrate 21, as shown in FIG. 4. In this case, the one terminal becomes a light input terminal 20a, while the another terminal becomes a light output terminal 20b. Further, the optical waveguide 20 is branched into two paths in an intermediate portion. The intermediate portion functions as a phase shifter portion 20c of Mach-Zehnder interferometer type.

The optical waveguide 20 is formed by depositing a titanium metal film having the width of 5 to 20 μm and the thickness of 500 to 1200 Å through the known sputtering method and thereafter, heating in an atmosphere of 900 to 1100° C. for 5 to 1220 hours to diffuse a titanium into the crystal substrate 21. The buffer layer 22 has a dielectric constant of 1.1 to 40 and the thickness of 1 to 10 μm. The signal electrode 23 comprises an active portion 23a and feeder portions 23b. In this case, the active portion 23a causes the electro-optical effect for the optical waveguide 20 by supplying microwave signals, while the feeder portions 23b are electrically connected to the both ends of the active portion 23a and are connected to connectors 25 for supplying the microwave signals.

The active portion 23a has the width of 5 to 20 μm and the thickness of 3 to 40 μm and is perpendicularly bended at the both ends. Further, the active portion 23a has the length L of 10 to 70 μm at a portion parallel to the optical waveguide 20. The feeder portion 23b has the same thickness as the active portion 23a and the width$_{pad}$ of 10 to 200 μm which is wider than the width W of the active portion 23a. Therefore, a connection portion between the active portion 23a and the feeder portion 23b becomes a taper form. Further, the width$_{pad}$ of the feeder portion 23b is narrower than the width$_{conn}$ of the connector 25. The ground electrode 24 has the width of 100 to 9000 μm, the length of 10 to 70 μm and the thickness of 3 to 40 μm.

The gap G between the active portion 23a and the ground electrode 24a and the gap $G_{pad}$ between the feeder portion 23b and the ground electrode 24a are designed based upon the width W of the active portion 23a and the width $W_{pad}$ of the feeder portion 23b, respectively (designed as small as possible to reduce the voltage). The above gap G is determined so that the value of W/G falls within the range between 0.1 and 1 (namely, G=5–200 μm). In addition, the above gap $G_{pad}$ is determined so that the value of $W_{pad}/G_{pad}$ is equal to the value of W/G or less. Further, the gap ($W_{pad}$+2Gpad) between the ground electrodes 24a and 24b at the feeder portion 23b is wider than the width $W_{conn}$ of the connector 25. As a result, the connector 25 does not contact with the ground electrode 24 when the connector 25 is connected to the feeder portion 23b. For example, the gap $G_{pad}$ is set to a half of the width $W_{conn}$ of the connector 25.

Further, the connector 25 is directly or indirectly attached to the feeder portion 23b. Thereby, the microwave signals are given to the signal electrode 23 via the connector 24. On the other hand, fiber mounts 26 are attached to the light input terminal 20a and the light output terminal 20b, respectively. The light goes in and out of the optical waveguide 20 via the fiber mounts 26.

Figure 3:
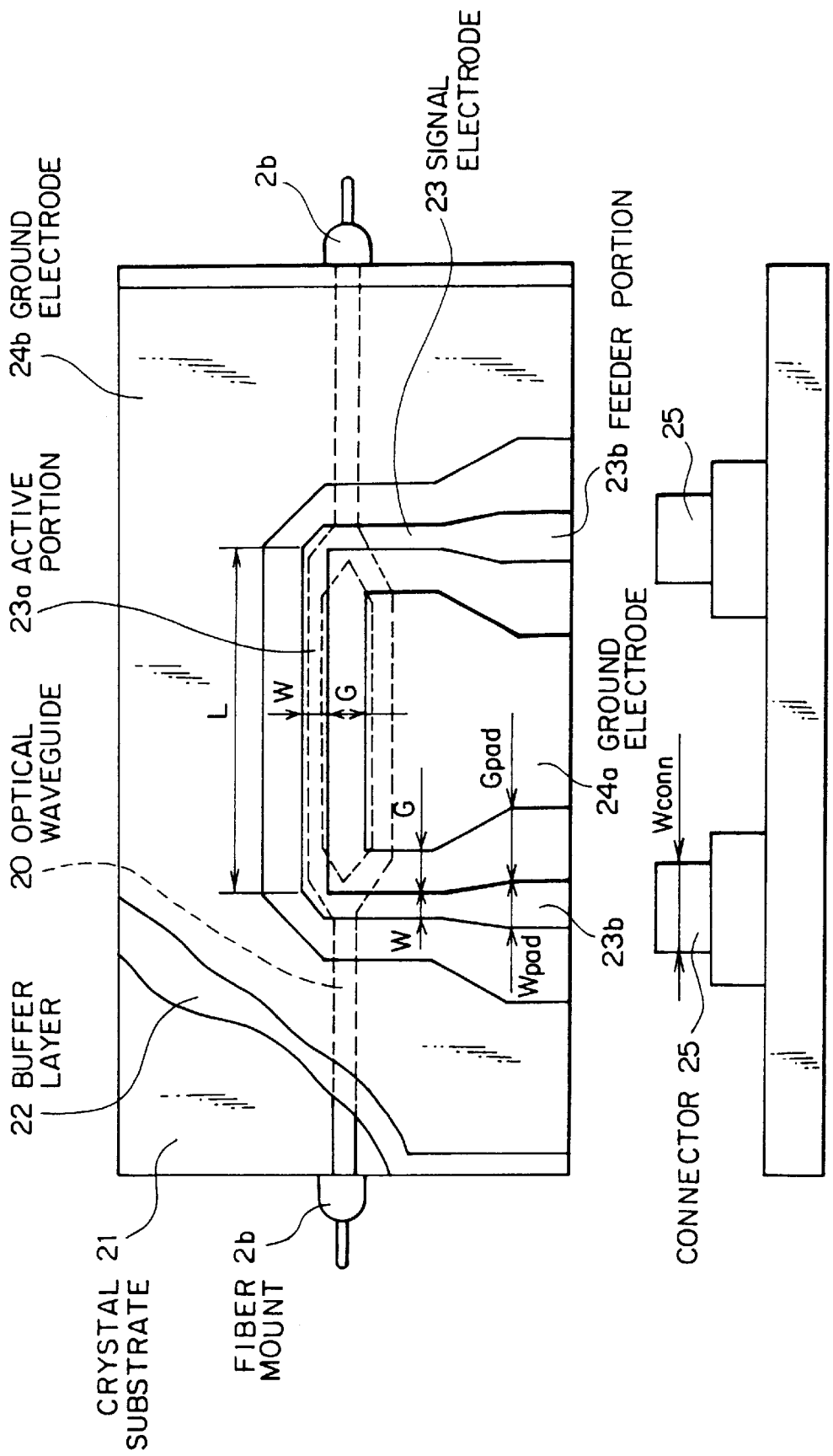
FIG. 3 is a partially sectional plan view showing an optical waveguide type device according to a first embodiment.
Figure 6:
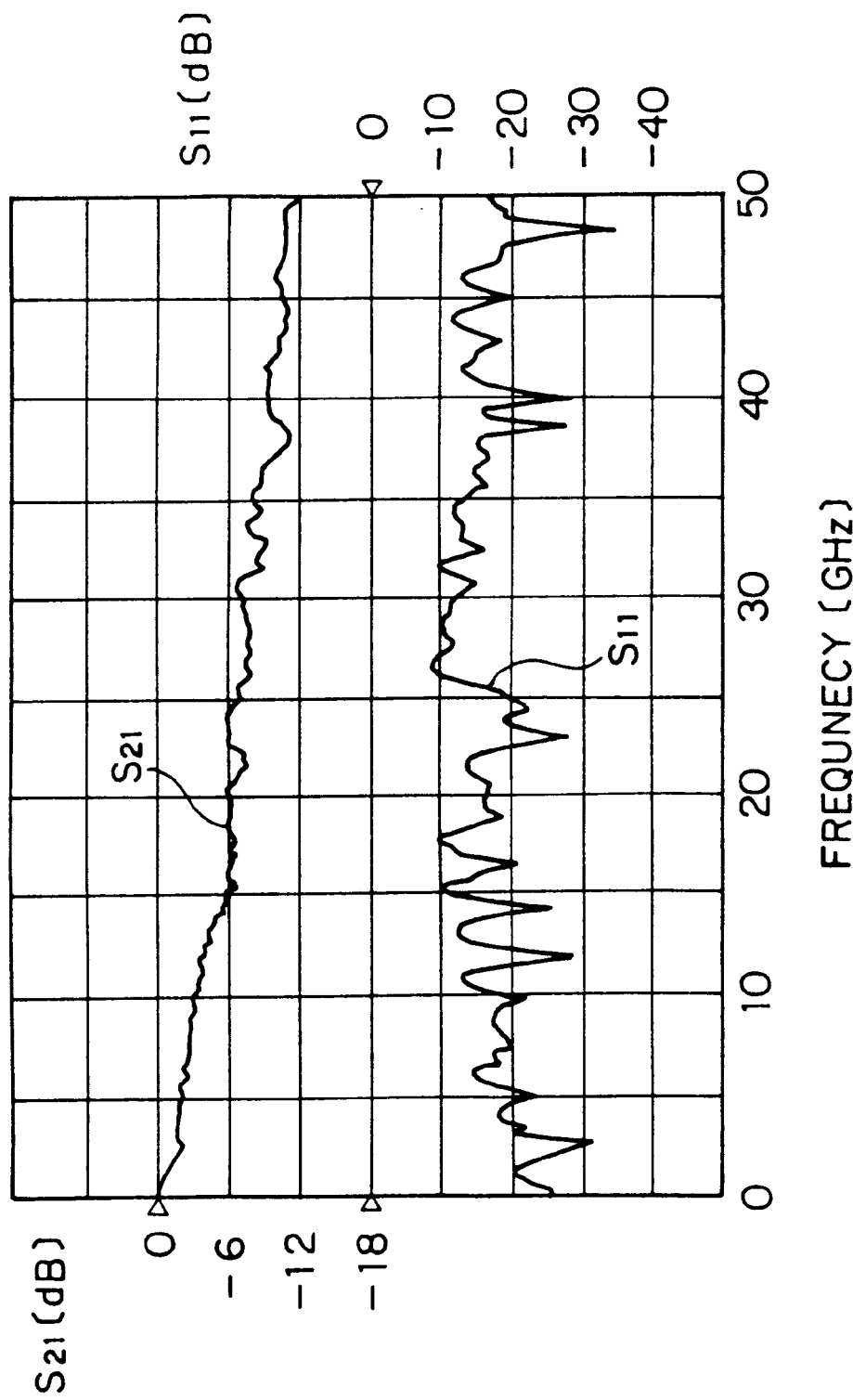
FIG. 6 shows an electric characteristics of the optical waveguide type device in FIG. 3.

FIG. 6 shows a measuring result of the electric characteristic (S parameter) of the optical waveguide type device (optical modulator) having the structure shown in FIG. 3. FIG. 6 illustrates the reflection $S_{11}$ and the attenuation $S_{21}$ of the microwave for the frequency. It is found out from FIG. 6 that the attenuation $S_{21}$ of the microwave represents the function of the frequency based upon the theory. Further, the attenuation $S_{21}$ of the microwave is small as compared to the conventional optical modulator when the frequency exceeds 5 GHz. On the other hand, the reflection $S_{11}$ of the microwave is also superior to the conventional optical waveguide type device on the whole, and is restrained within the range between −20 dB and −10 dB.

As mentioned above, the width $W_{pad}$ of the feeder portion 23b is wider than the width W of the the active portion 23a and is narrower than the width$_{conn}$ of the connecter 25. Further, the feeder portion 23b and the active portion 23a are connected at the taper portion. In addition, the width $W_{pad}$ of the feeder portion 23b is restricted so that the connector 25 does not contact with the ground electrodes 24a and 24b. Consequently, the microwave from the connector 25 is supplied to the signal electrode 23 with a low loss. In addition, the microwave which is given to the signal electrode 23 propagates to the active portion 23a through the feeder portion 23b, the taper portion and the bending portion with a low loss. As a result, the reflection characteristic of the microwave is improved, and the electric characteristic (S parameter) and the optical characteristic can be enhanced at the maximum. Accordingly, the loss of the microwave and the reflection characteristic can be largely improved as compared to the conventional optical waveguide type device. Consequently, the optical waveguide type device having a wide bandwidth of 20 GHz or more and an excellent reflection characteristic can be obtained.

Second embodiment

Figure 7:
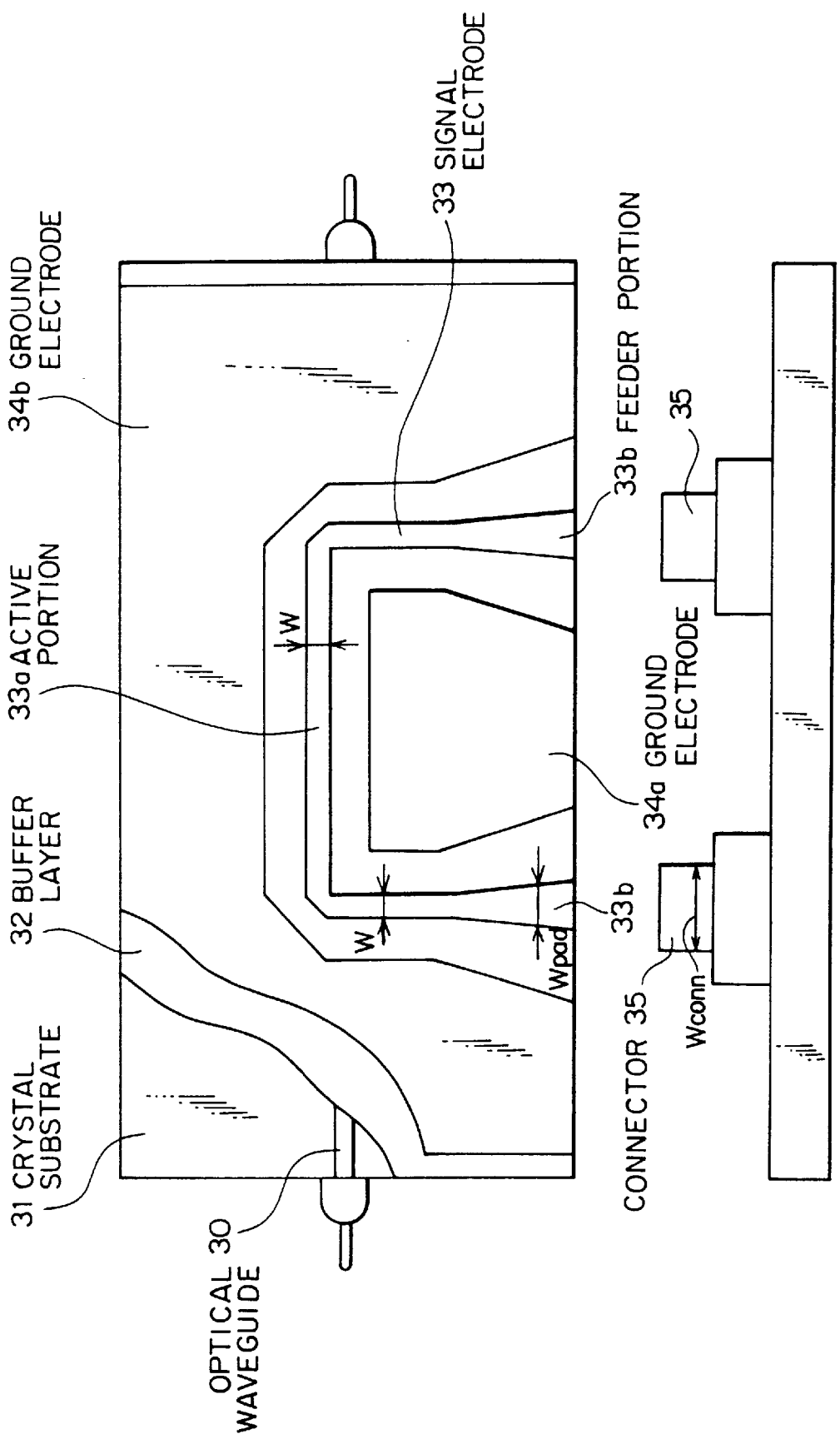
FIG. 7 is a partially sectional plan view showing an optical waveguide type device according to a second embodiment.

Referring to FIG. 7, an optical waveguide type device according to a second embodiment of this invention will be described below.

The second embodiment is similar to the first embodiment except for the configuration of a feeder portion.

An optical waveguide 30 is formed in a crystal substrate 31. A buffer layer 32 is entirely formed on the crystal substrate 31. Further, a coplanar waveguide (CPW) type electrode structure is formed on the buffer layer 32. The CPW type electrode structure has one signal electrode 33 and two ground electrodes 34a and 34b.

The signal electrode 33 comprises an active portion 33a and feeder portions 33b. In this case, the active portion 33a causes the electro-optical effect for the optical waveguide 30 by supplying microwave signals. In the second embodiment, the feeder portion 33b itself is formed in a taper form different from the first embodiment. In this condition, the feeder portions 33b are electrically connected to the both ends of the active portion 33a and are connected to connectors 35. In this event, the width $W_{pad}$ of the feeder portion 33b is wider than the width W of the the active portion 33a and is narrower than the widthconn of the connecter 35 like in the first embodiment. Under this circumstances, the microwave which is given to the signal electrode 33 propagates to the active portion 33a through the tapered feeder portion 33b and the bending portion with a low loss. The second embodiment can also obtain the same effect as the first embodiment.

Third embodiment

Figure 8:
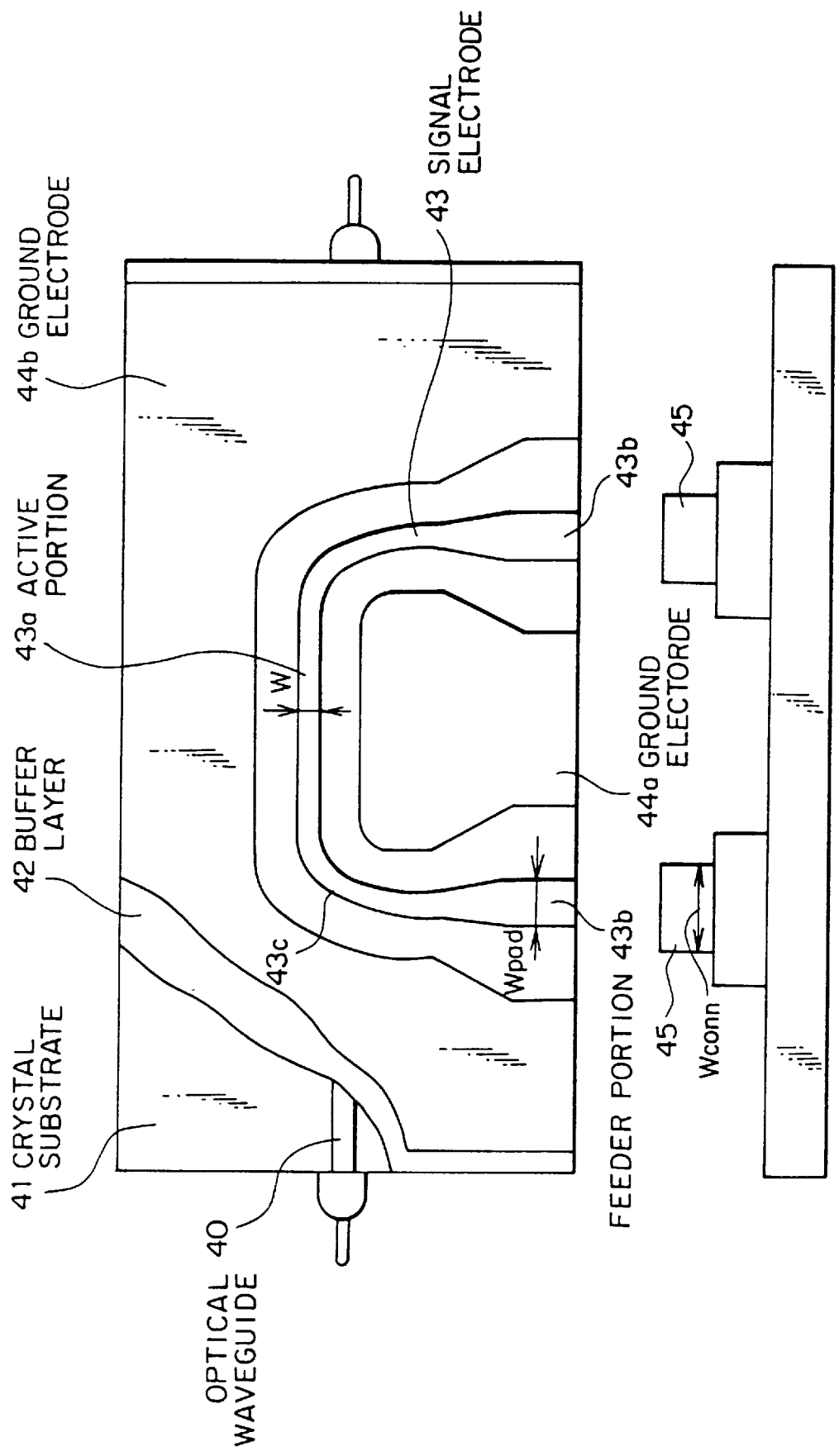
FIG. 8 is a partially sectional plane view showing an optical waveguide type device according to a third embodiment.

Referring to FIG. 8, an optical waveguide type device according to a third embodiment of this invention will be described below.

The third embodiment is similar to the first embodiment except for the configuration of a bending portion of an active portion.

An optical waveguide 40 is formed in a crystal substrate 41. A buffer layer 42 is entirely formed on the crystal substrate 41. Further, a coplanar waveguide (CPW) type electrode structure is formed on the buffer layer 42. The CPW type electrode structure has one signal electrode 43 and two ground electrodes 44a and 44b.

The signal electrode 43 comprises an active portion 43a and feeder portions 43b. In this case, the active potion 43a has the bending portion 43c. The active portion 43a is connected to the feeder portion 43b via the bending portion 43c. In the third embodiment, the bending portion 43c is formed in a circular form different from the first embodiment. The feeder portions 43b are connected to connectors 45. In this case, the active portion 43a causes the electro-optical effect for the optical waveguide 40 by supplying microwave signals.

In this event, the width $W_{pad}$ of the feeder portion 43b is wider than the width W of the the active portion 43a and is narrower than the width$_{conn}$ of the connecter 45 like in the first embodiment. Under this circumstances, the microwave which is given to the signal electrode 43 propagates to the active portion 43a through the feeder portion 43b and the bending portion 43c of the circular form with a low loss. The third embodiment can also obtain the same effect as the first embodiment.

Fourth embodiment

Figure 9:
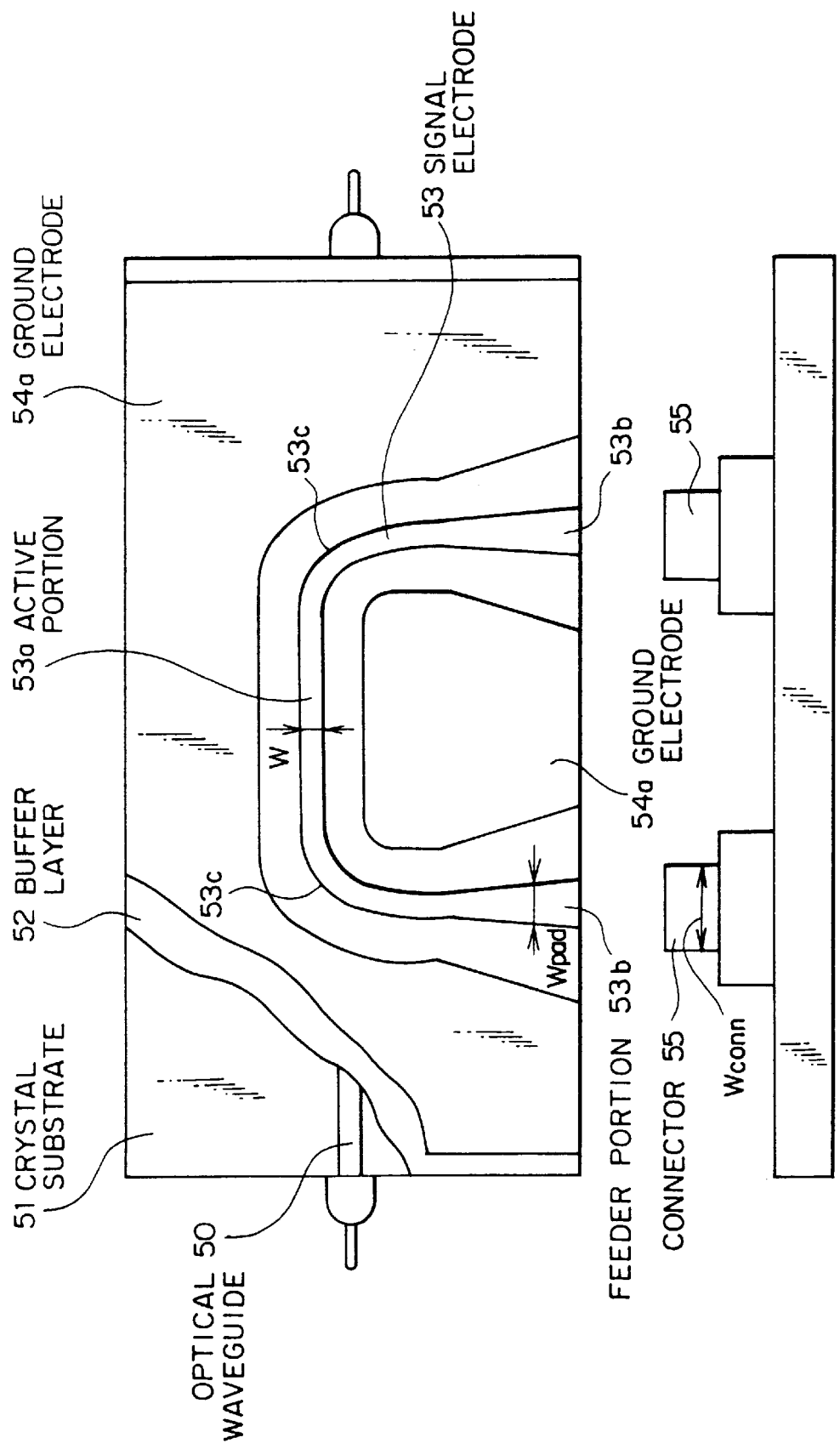
FIG. 9 is a partially sectional plan view showing an optical waveguide type device according to a fourth embodiment.

Referring to FIG. 9, an optical waveguide type device according to a fourth embodiment of this invention will be described below.

The fourth embodiment is similar to the first embodiment except for configurations of a feeder portion and a bending portion of an active portion.

An optical waveguide 50 is formed in a crystal substrate 51. A buffer layer 52 is entirely formed on the crystal substrate 51. Further, a coplanar waveguide (CPW) type electrode structure is formed on the buffer layer 52. The CPW type electrode structure has one signal electrode 53 and two ground electrodes 54a and 54b.

The signal electrode 53 comprises an active portion 53a and feeder portions 53b. In this case, the active potion 53a has the bending portion 53c. The active portion 53a is connected to the feeder portion 53b via the bending portion 53c. In the forth embodiment, the bending portion 53c is formed in a circular form like in the third embodiment. In addition, the feeder portion 53b itself is formed in a taper form like in the second embodiment.

In this condition, the feeder portions 53b are connected to connectors 55. In this event, the width $W_{pad}$ of the feeder portion 53b is wider than the width W of the the active portion 53a and is narrower than the width$_{conn}$ of the connecter 55 like in the first embodiment. Under this circumstances, the microwave which is given to the signal electrode 53 propagates to the active portion 53a through the tapered feeder portion 53b and the bending portion 53c of the circular form with a low loss. The fourth embodiment can also obtain the same effect as the first embodiment.

Fifth embodiment

Figure 10:
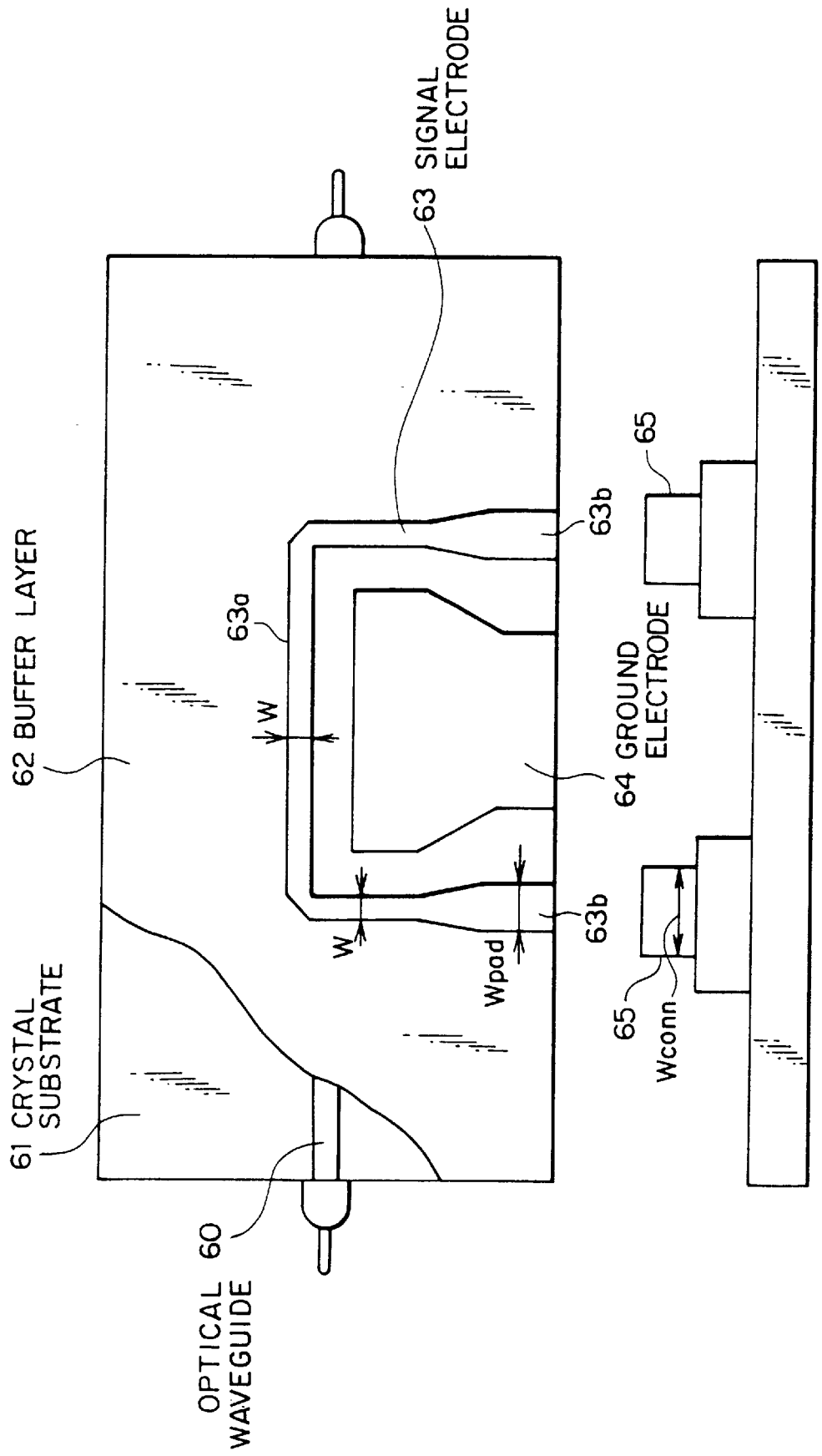
FIG. 10 is a partially sectional plan view showing an optical waveguide type device according to a fifth embodiment.

Referring to FIG. 10, an optical waveguide type device according to a fifth embodiment of this invention will be described below.

The fifth embodiment is similar to the first embodiment except for the configuration of an electrode.

An optical waveguide 60 is formed in a crystal substrate 61. A buffer layer 62 is entirely formed on the crystal substrate 61. In the fifth embodiment, an asymmetric strip line (ASL) or an asymmetric coplanar strip (ACPS) type electrode structure is formed on the buffer layer 62 different from the first embodiment. The ASL or ACPS type electrode structure has one signal electrode 63 and one ground electrode 64.

The signal electrode 63 comprises an active portion 63a and feeder portions 63b. In this case, the active portion 63a causes the electro-optical effect for the optical waveguide 60 by supplying microwave signals. In this condition, the feeder portions 63b are electrically connected to the both ends of the active portion 63a and are connected to connectors 65. In this event, the width $W_{pad}$ of the feeder portion 63b is wider than the width W of the the active portion 63a and is narrower than the width$_{conn}$ of the connecter 65 like in the first embodiment. Under this circumstances, the microwave which is given to the signal electrode 63 propagates to the active portion 63a through the feeder portion 63b and the bending portion with a low loss. The fifth embodiment can also obtain the same effect as the first embodiment.

Sixth embodiment

Figure 11:
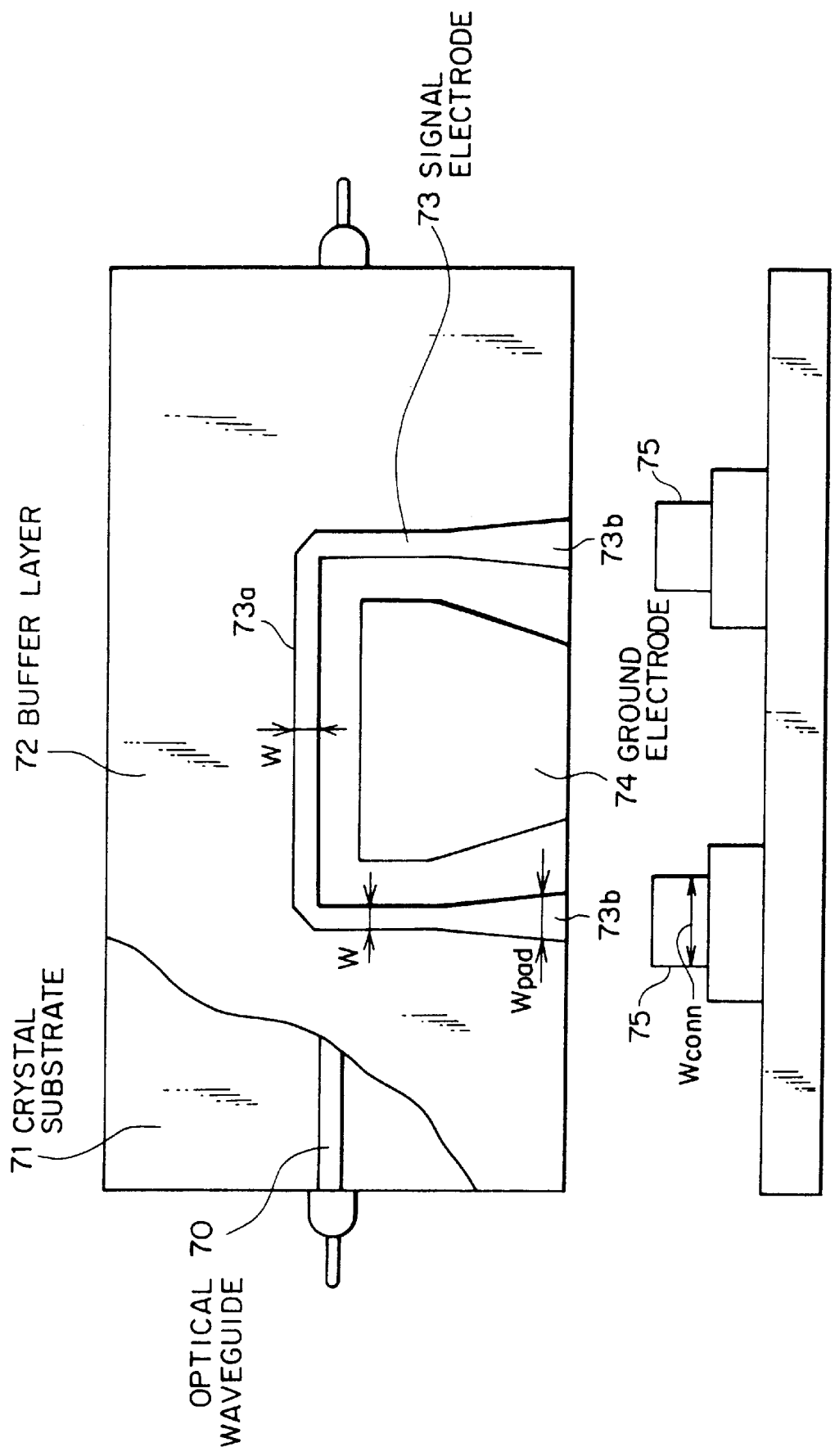
FIG. 11 is a partially sectional plan view showing an optical waveguide type device according to a sixth embodiment.

Referring to FIG. 11, an optical waveguide type device according to a sixth embodiment of this invention will be described below.

The sixth embodiment is similar to the second embodiment except for the configuration of an electrode.

An optical waveguide 70 is formed in a crystal substrate 71. A buffer layer 72 is entirely formed on the crystal substrate 71. In the sixth embodiment, an asymmetric strip line (ASL) or an asymmetric coplanar strip (ACPS) type electrode structure is formed on the buffer layer 72 different from the second embodiment. The ASL or ACPS type electrode structure has one signal electrode 73 and one ground electrode 74.

The signal electrode 73 comprises an active portion 73a and feeder portions 73b. In this case, the feeder portion 73b itself is formed in a taper form. The feeder portions 73b are connected to connectors 75. In this event, the width $W_{pad}$ of the feeder portion 73b is wider than the width W of the the active portion 73a and is narrower than the width$_{conn}$ of the connecter 75 like in the second embodiment. Under this circumstances, the microwave which is given to the signal electrode 73 propagates to the active portion 73a through the tapered feeder portion 73b and the bending portion with a low loss. The sixth embodiment can also obtain the same effect as the second embodiment.

Seventh embodiment

Figure 12:
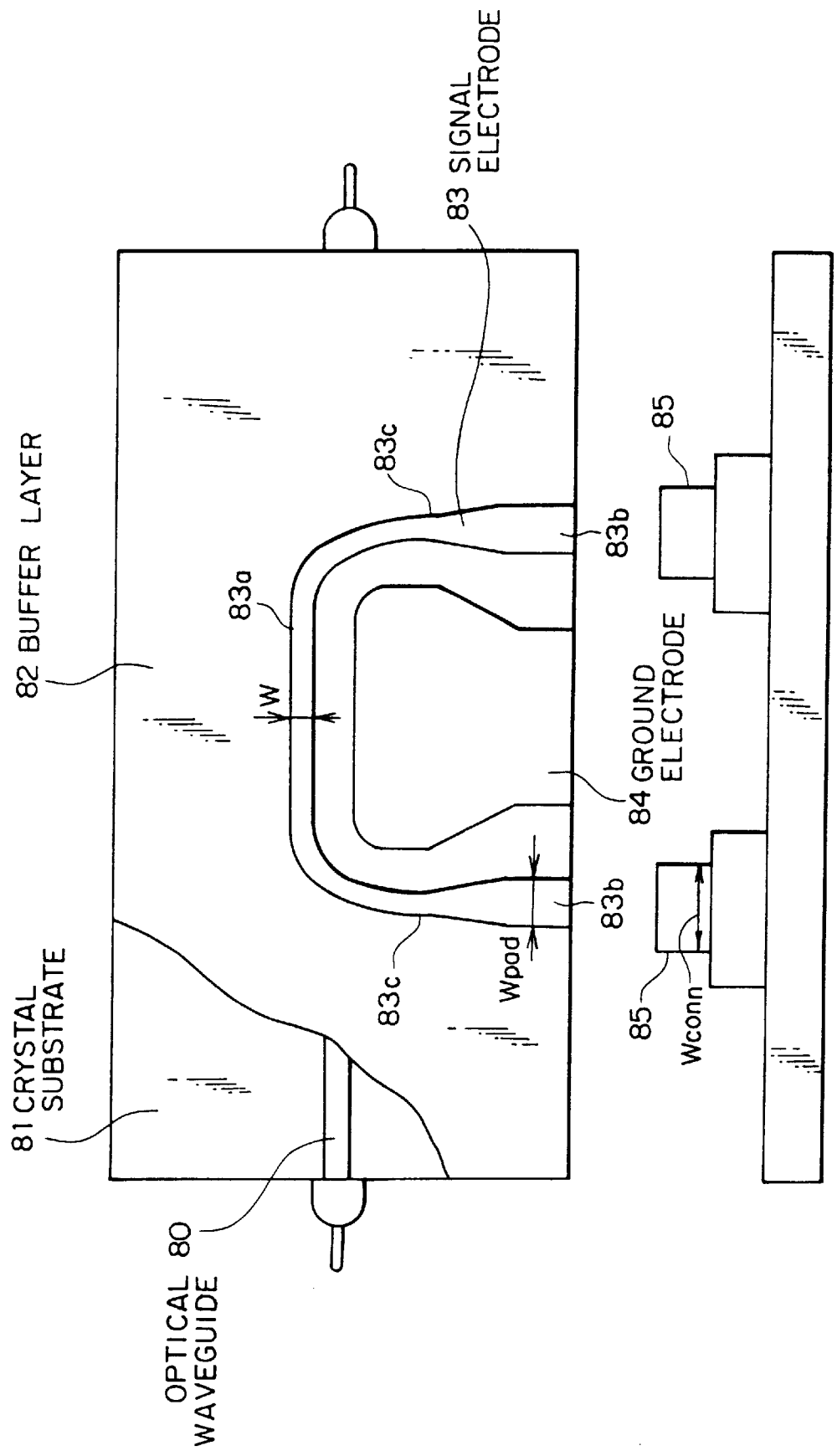
FIG. 12 is a partially sectional plan view showing an optical waveguide type device according to a seventh embodiment.

Referring to FIG. 12, an optical waveguide type device according to a seventh embodiment of this invention will be described below.

The seventh embodiment is similar to the third embodiment except for the configuration of an electrode.

An optical waveguide 80 is formed in a crystal substrate 81. A buffer layer 82 is entirely formed on the crystal substrate 81. In the seventh embodiment, an asymmetric strip line (ASL) or an asymmetric coplanar strip (ACPS) type electrode structure is formed on the buffer layer 82 different from the third embodiment. The ASL or ACPS type electrode structure has one signal 83 electrode and one ground electrode 84.

The signal electrode 83 comprises an active portion 83a and feeder portions 83b. In this case, the active potion 83a has the bending portion 83c. The active portion 83a is connected to the feeder portion 83b via the bending portion 83c. The bending portion 83c is formed in a circular form like in the third embodiment.

In this event, the width $W_{pad}$ of the feeder portion 83b is wider than the width W of the the active portion 83a and is narrower than the width$_{conn}$ of the connecter 85 like in the third embodiment. Under this circumstances, the microwave which is given to the signal electrode 83 propagates to the active portion 83a through the feeder portion 83b and the bending portion 83c of the circular form with a low loss. The seventh embodiment can also obtain the same effect as the third embodiment.

Eighth embodiment

Figure 13:
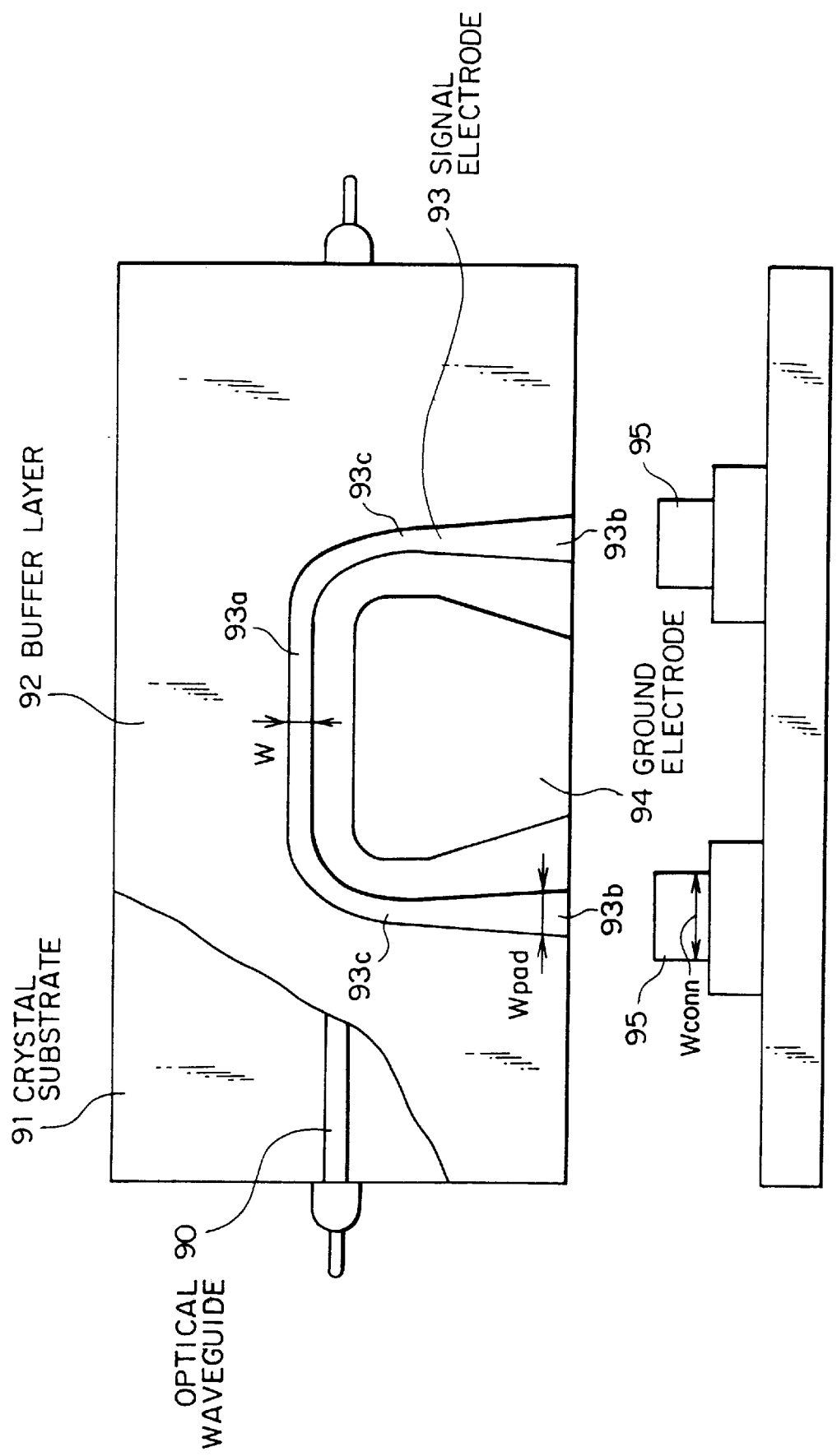
FIG. 13 is a partially sectional plan view showing an optical waveguide type device according to an eighth embodiment.

Referring to FIG. 13, an optical waveguide type device according to an eighth embodiment of this invention will be described below.

The eighth embodiment is similar to the fourth embodiment except for configurations of an electrode.

An optical waveguide 90 is formed in a crystal substrate 91. A buffer layer 92 is entirely formed on the crystal substrate 91. In the eighth embodiment, an asymmetric strip line (ASL) or an asymmetric coplanar strip (ACPS) type electrode structure is formed on the buffer layer 92 different from the fourth embodiment. The ASL or ACPS type electrode structure has one signal electrode 93 and one ground electrode 94.

The signal electrode 93 comprises an active portion 93a and feeder portions 93b. In this case, the active potion 93a has the bending portion 93c. The active portion 93a is connected to the feeder portion 93b via the bending portion 93c. The bending portion 93c is formed in a circular form and the feeder portion 93b itself is formed in a taper form like in the fourth embodiment.

In this event, the width $W_{pad}$ of the feeder portion 93b is wider than the width W of the the active portion 93a and is narrower than the width$_{conn}$ of the connecter 95 like in fourth first embodiment. Under this circumstances, the microwave which is given to the signal electrode 93 propagates to the active portion 93a through the tapered feeder portion 93b and the bending portion 93c of the circular form with a low loss. The eighth embodiment can also obtain the same effect as the fourth embodiment.

Ninth embodiment

Figure 14:
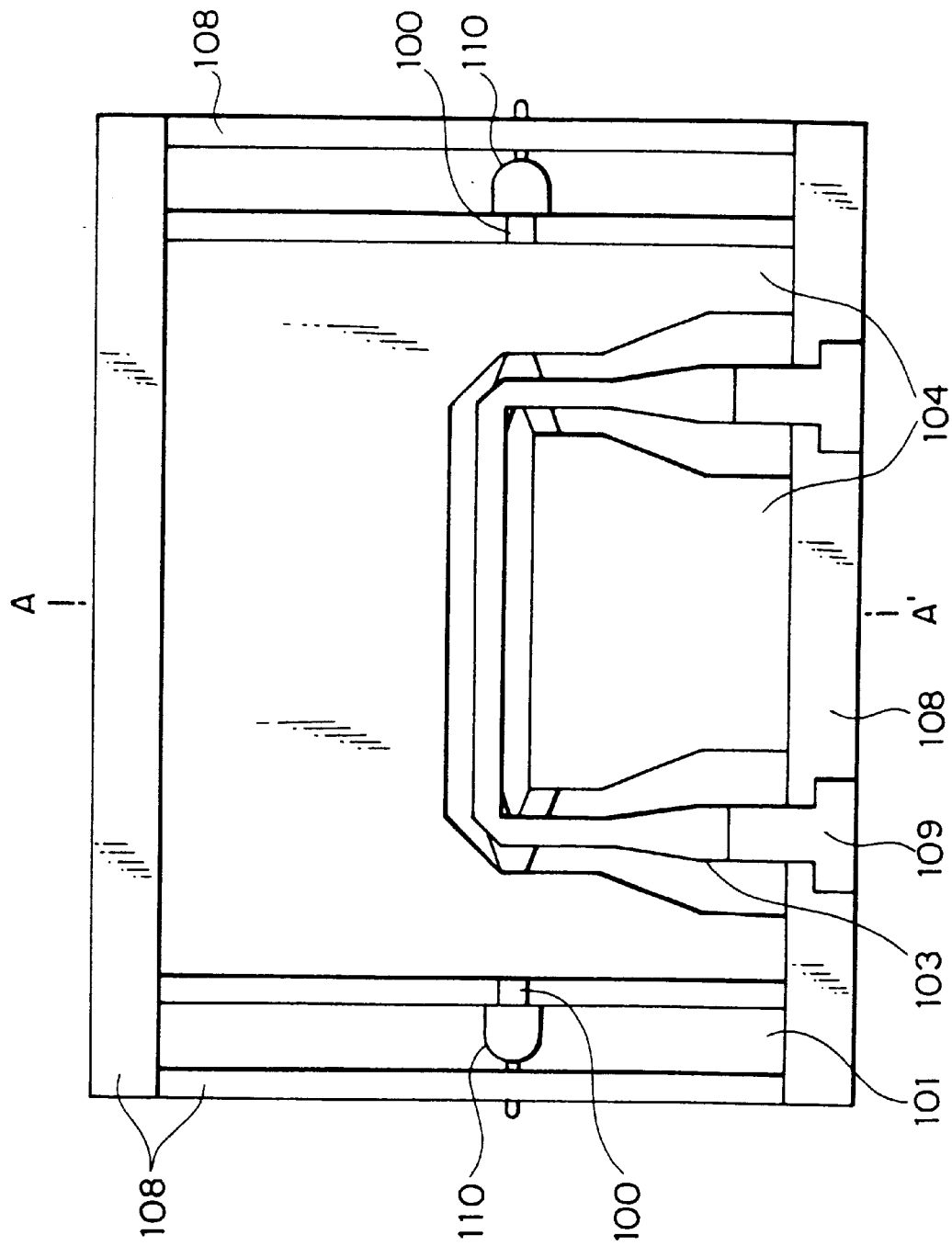
FIG. 14 is a plan view showing an optical waveguide type device according to an ninth embodiment.
Figure 15:
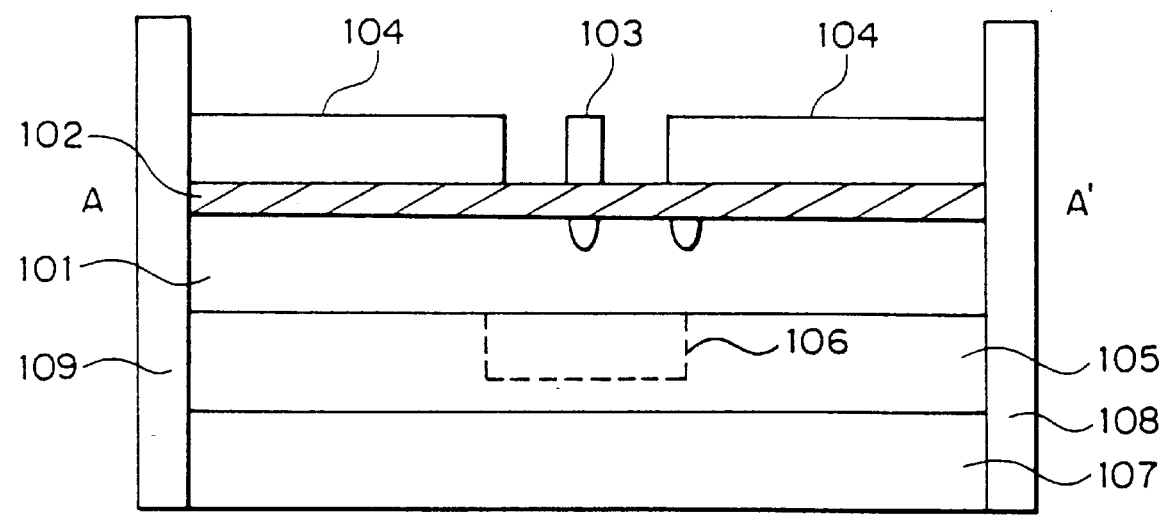
FIG. 15 is a cross sectional view showing the optical waveguide type device in FIG. 14, taken along A–A' line in FIG. 14.
Figure 16:
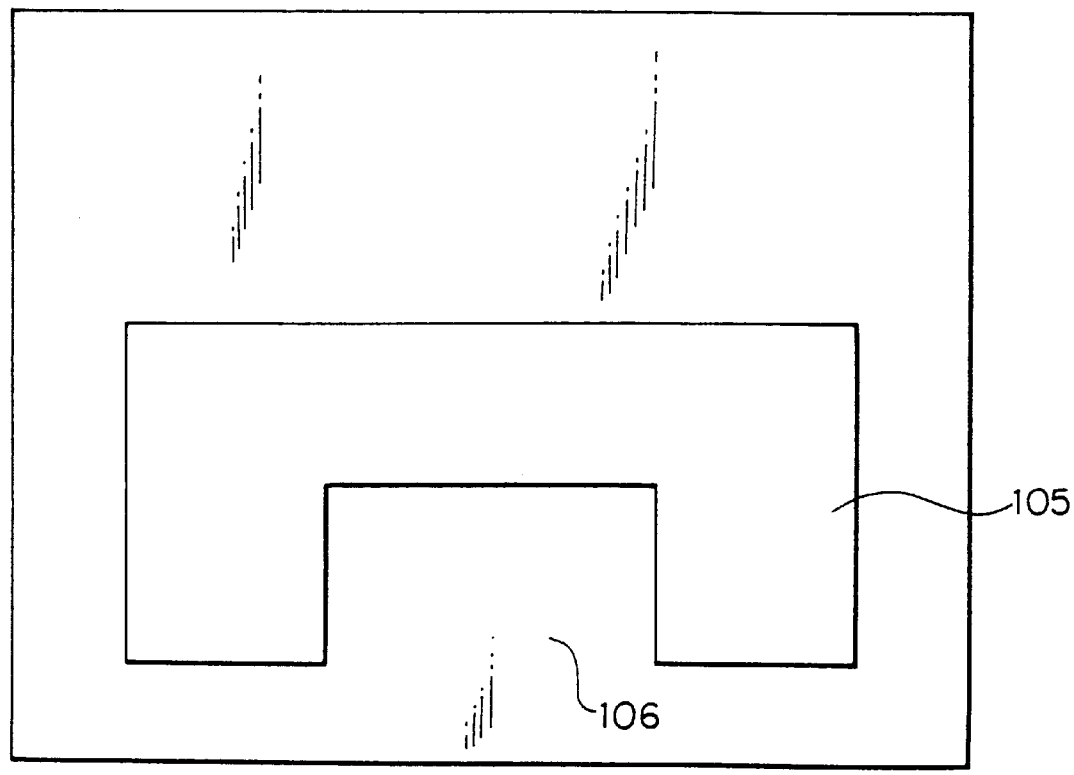
FIG. 16 shows a dielectric substrate having a groove in FIG. 15.

Referring to FIGS. 14 to 16, an optical waveguide type device according to a ninth embodiment of this invention will be described below.

An optical waveguide 100 is formed in a crystal substrate 101 (for example, LiNbO$_3$ substrate) having an electro-optical effect. The optical waveguide 100 is formed by depositing titanium metal film strip of the width of 5–20 μm and the thickness of 500–1200 Å and diffusing titanium into the crystal substrate 101 at a temperature of 900–1100° C. for 5–12 hours. The optical waveguide 100 comprises a light input terminal and a light output terminal, as shown in FIG. 4. Further, the optical wave guide is branched into two paths at an intermediate portion. The intermediate portion functions as a phase shifter portion, as shown in FIG. 4.

A buffer layer 102 (dielectric layer with dielectric constant of 1.2–40) having the thickness of 1–10 μm is entirely formed on the crystal substrate 101 to cover the optical waveguide 100, as shown in FIG.15. In this case, the buffer layer 102 is uniformly coated on the crystal substrate 101. In addition, a coplanar waveguide (CPW) type electrode structure is formed on the buffer layer 102. The CPW type electrode structure has one signal electrode 103 and two ground electrodes 104. In this event, the signal electrode 103 has the width (W) of 5–20 μm, the length (L) of 10–70 mm and the thickness 3–40 μm, while the ground electrode 104 has the width(W) of 100–9000 μm, the length (L) of 10–70 mm and the thickness 3–40 μm. The gap G between the signal electrode 103 and the ground electrode 104 is selected so that the value of W/G falls within the range between 1 and 0.1 (namely, G=5–200 μm).

The crystal substrate 101 is arranged on a dielectric substrate 105 having the thickness of 0.5–5 mm and the width of 0.5–20 mm, as shown in FIG. 15. A groove 106 is formed in the dielectric substrate 105 under at least the signal electrode 103 and between the ground electrodes 104, as shown in FIGS. 15 and 16. In this case, the groove 106 has the thickness of 0.5–5 mm and the width of 10 μm–10 mm. In addition, a metal substrate 107 is disposed under the dielectric substrate 105. The substrates 101, 105, 107 are placed in a metal box 108 (or metal package).

Further, a connector 109 is attached to the signal electrode 103. A microwave signals are given to the signal electrode 103 via the connector 109. Fiber mounts 110 are attached to the both sides (the light input terminal and the light output terminal) of the optical waveguide 100. The light goes in and out of the optical waveguide 100 via the fiber mounts 110.

Tenth embodiment

Figure 17:
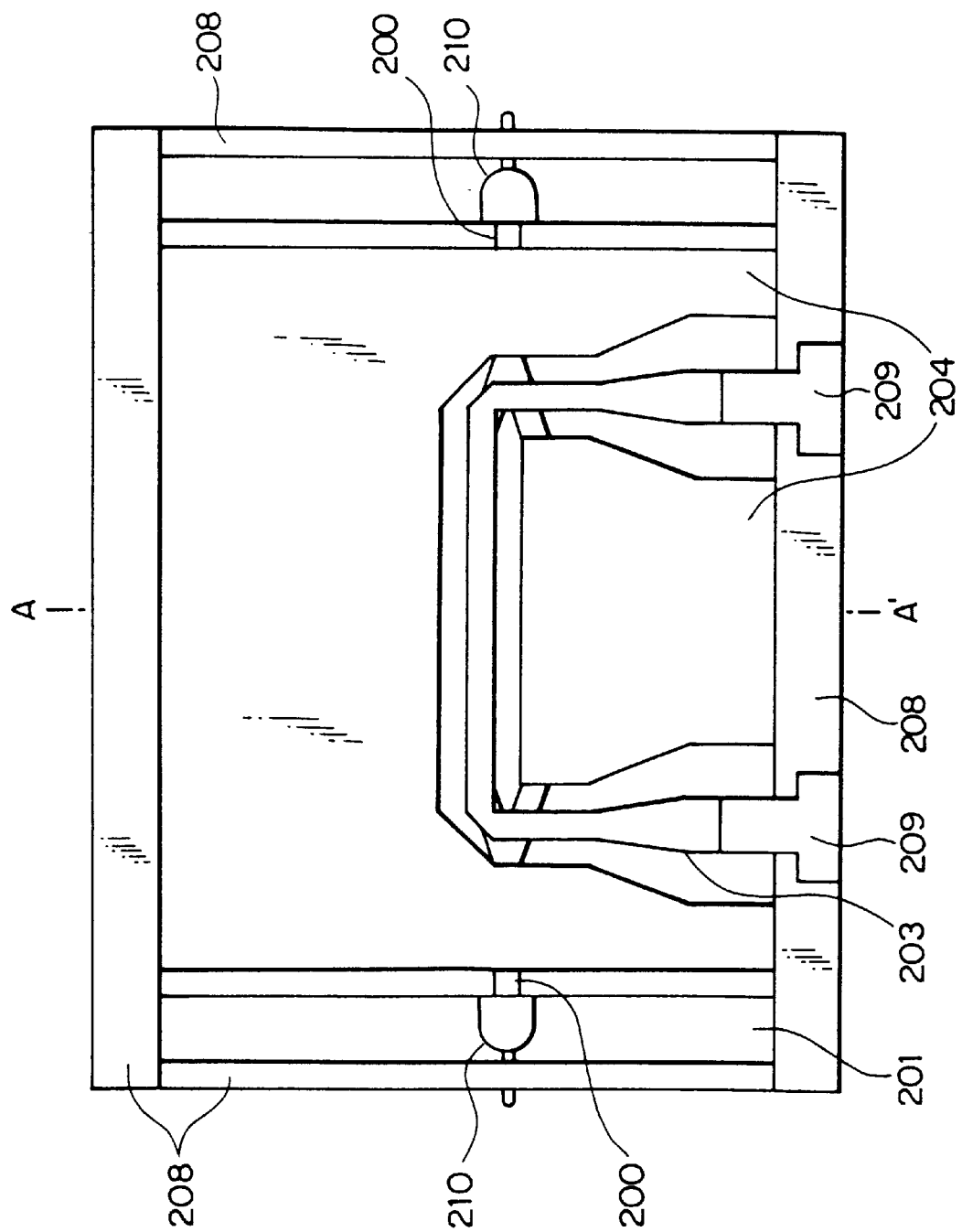
FIG. 17 is a plan view showing an optical waveguide type device according to an tenth embodiment.
Figure 18:
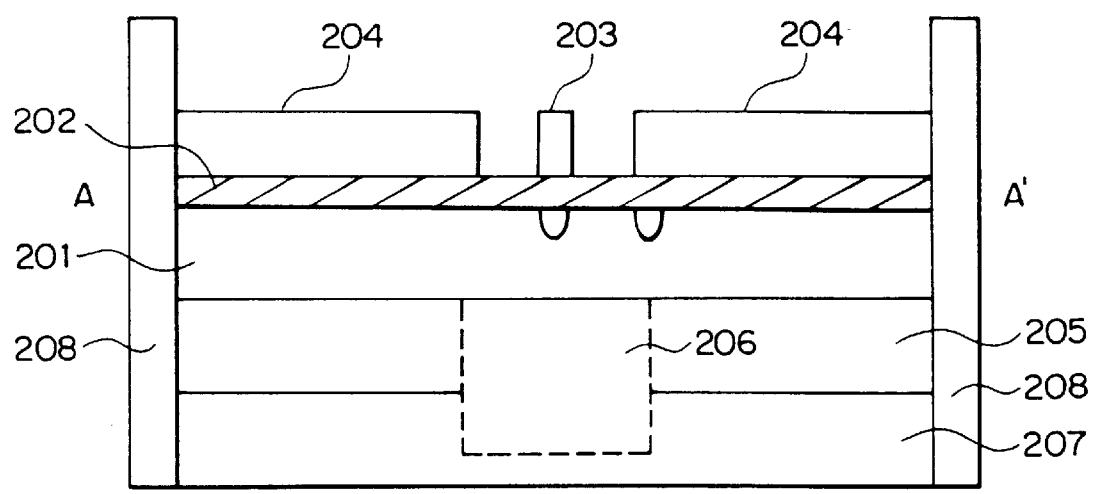
FIG. 18 is a cross sectional view showing the optical waveguide type device in FIG. 17, taken along A–A' line in FIG. 17.
Figure 19:
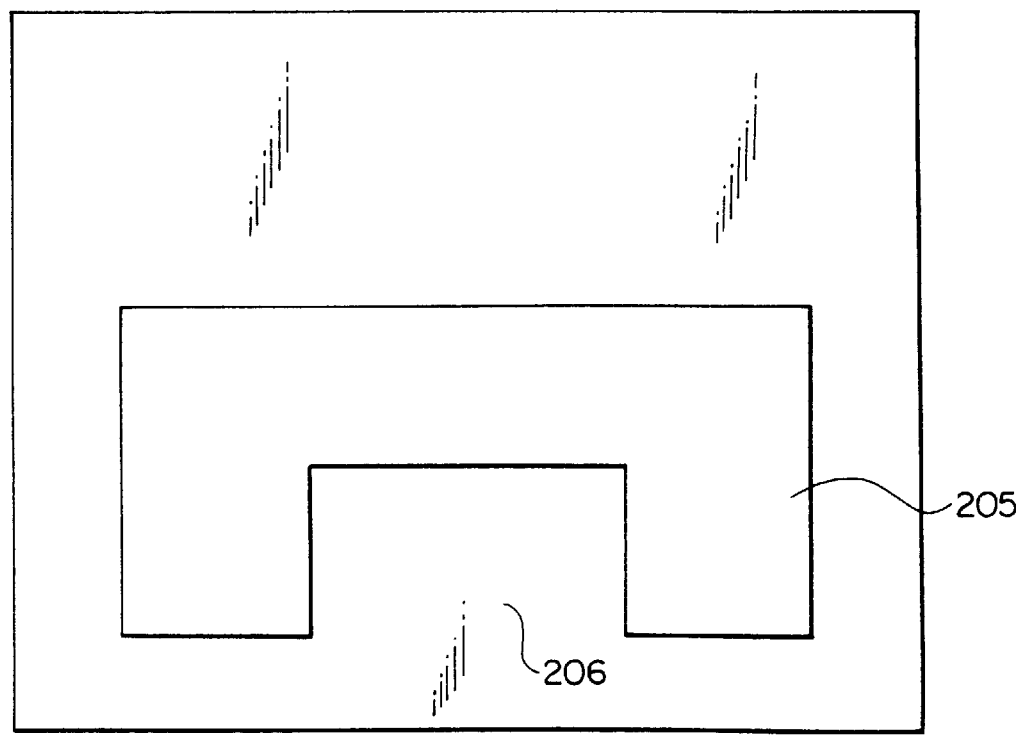
FIG. 19 shows a dielectric substrate having a groove in FIG. 18.

Referring to FIGS. 17 to 19, an optical waveguide type device according to a tenth embodiment of this invention will be described below.

The tenth embodiment is similar to the ninth embodiment except for configuration of a metal substrate.

An optical waveguide 200 is formed in a crystal substrate 201. The optical waveguide 200 comprises a light input terminal and a light output terminal, as shown in FIG. 4. Further, the optical waveguide 200 is branched into two paths at an intermediate portion. The intermediate portion functions as a phase shifter portion, as shown in FIG. 4.

A buffer layer 202 is entirely formed on the crystal substrate 201, as shown in FIG. 18. In addition, a coplanar waveguide (CPW) type electrode structure is formed on the buffer layer 202. The CPW type electrode structure has one signal electrode 203 and two ground electrodes 204.

The crystal substrate 201 is arranged on a dielectric substrate 205, as shown in FIG. 18. In addition, a metal substrate 207 is disposed under the dielectric substrate 205. A groove is formed in the dielectric substrate 205 and the metal substrate 207 under at least the signal electrode 203 and between the ground electrodes 204, as shown in FIGS. 18 and 19. In the tenth embodiment, the microwave attenuation is further reduced as compared to the ninth embodiment because the air gap (206) is further enlarged.

The substrates 201, 205 and 207 are placed in a metal box 208 (or metal package). Further, a connectors 209 is attached to the signal electrode 203. A microwave signals are given to the signal electrode 203 via the connector 209. Fiber mounts 210 are attached to the both sides (the light input terminal and the light output terminal) of the optical waveguide 200. The light goes in and out of the optical waveguide 200 via the fiber mounts 210.

Eleventh embodiment

Figure 20:
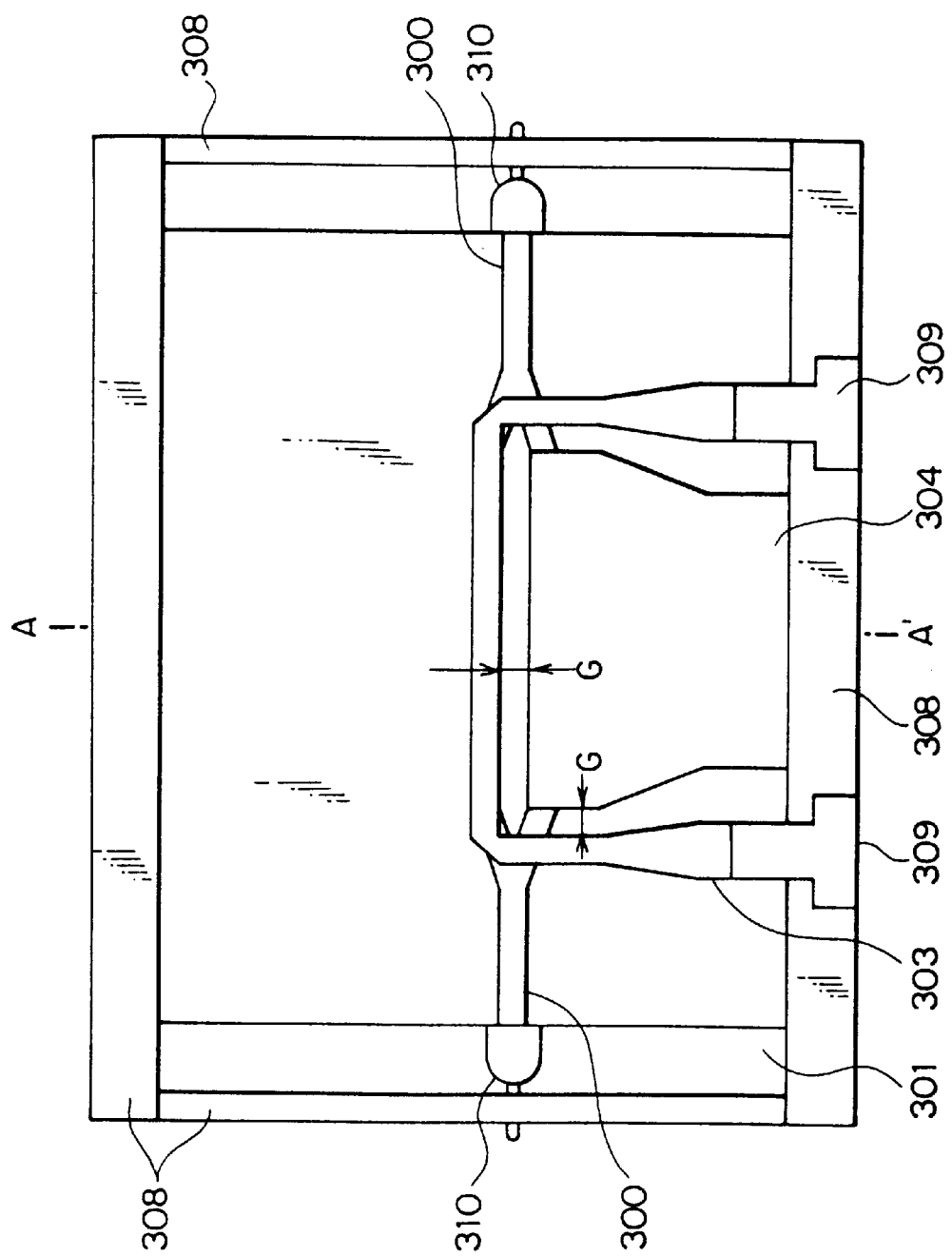
FIG. 20 is a plan view showing an optical waveguide type device according to an eleventh embodiment.
Figure 21:
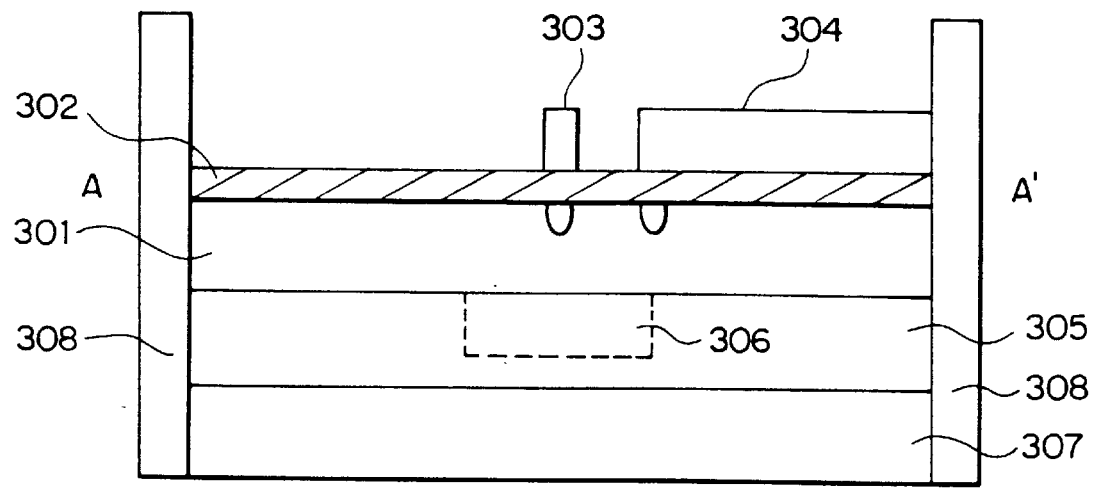
FIG. 21 is a cross sectional view showing the optical waveguide type device in FIG. 20, taken along A–A' line in FIG. 20.
Figure 22:
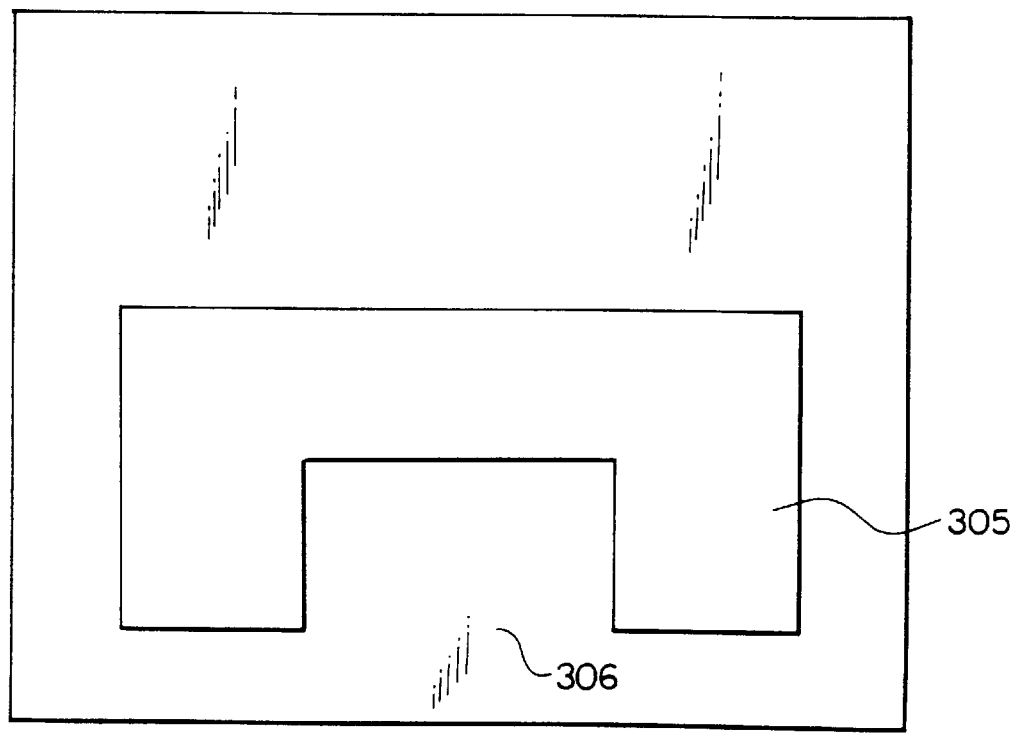
FIG. 22 shows a dielectric substrate having a groove in FIG. 21.

Referring to FIGS. 20 to 22, an optical waveguide type device according to an eleventh embodiment of this invention will be described below.

The eleventh embodiment is similar to the ninth embodiment except for a configuration of an electrode.

An optical waveguide 300 is formed in a crystal substrate 301. The optical waveguide 300 comprises a light input terminal and a light output terminal, as shown in FIG. 4. Further, the optical waveguide 300 is branched into two paths at an intermediate portion. The intermediate portion functions as a phase shifter portion, as shown in FIG. 4.

A buffer layer 302 is entirely formed on the crystal substrate 301. In the eleventh embodiment, an asymmetric strip line (ASL) or an asymmetric coplanar strip (ACPS) type electrode structure is formed on the buffer layer 302 different from the ninth embodiment. The ASL or ACPS type electrode structure has one signal electrode 303 and one ground electrode 304. In this event, the signal electrode 303 has the width (W) of 5–20 μm, the length (L) of 10–70 mm and the thickness 3–40 μm, while the ground electrode 304 has the width(W) of 100–9000 μm, the length (L) of 10–70 mm and the thickness 3–40 μm. The gap G between the signal electrode 303 and the ground electrode 304 is selected so that the value of W/G falls within the range between 1 and 0.1 (namely, G=5–200 μm).

The crystal substrate 301 is arranged on a dielectric substrate 305, as shown in FIG. 21. A groove 306 is formed in the dielectric substrate 305 under at least the signal electrode 303 and between at least the signal electrode 303 and the ground electrode 304, as shown in FIGS. 21 and 22. In this case, the groove 306 has the thickness of 0.5–5 mm and the width of 10 μm–10 mm. In addition, a metal substrate 307 is disposed under the dielectric substrate 305. The substrates 301, 305 and 307 are placed in a metal box 308 (or metal package).

Further, a connector 309 is attached to the signal electrode 303. A microwave signals are given to the signal electrode 303 via the connector 309. Fiber mounts 310 are attached to the both sides (the light input terminal and the light output terminal) of the optical waveguide 300. The light goes in and out of the optical waveguide 300 via the fiber mounts 310.

Twelfth embodiment

Figure 23:
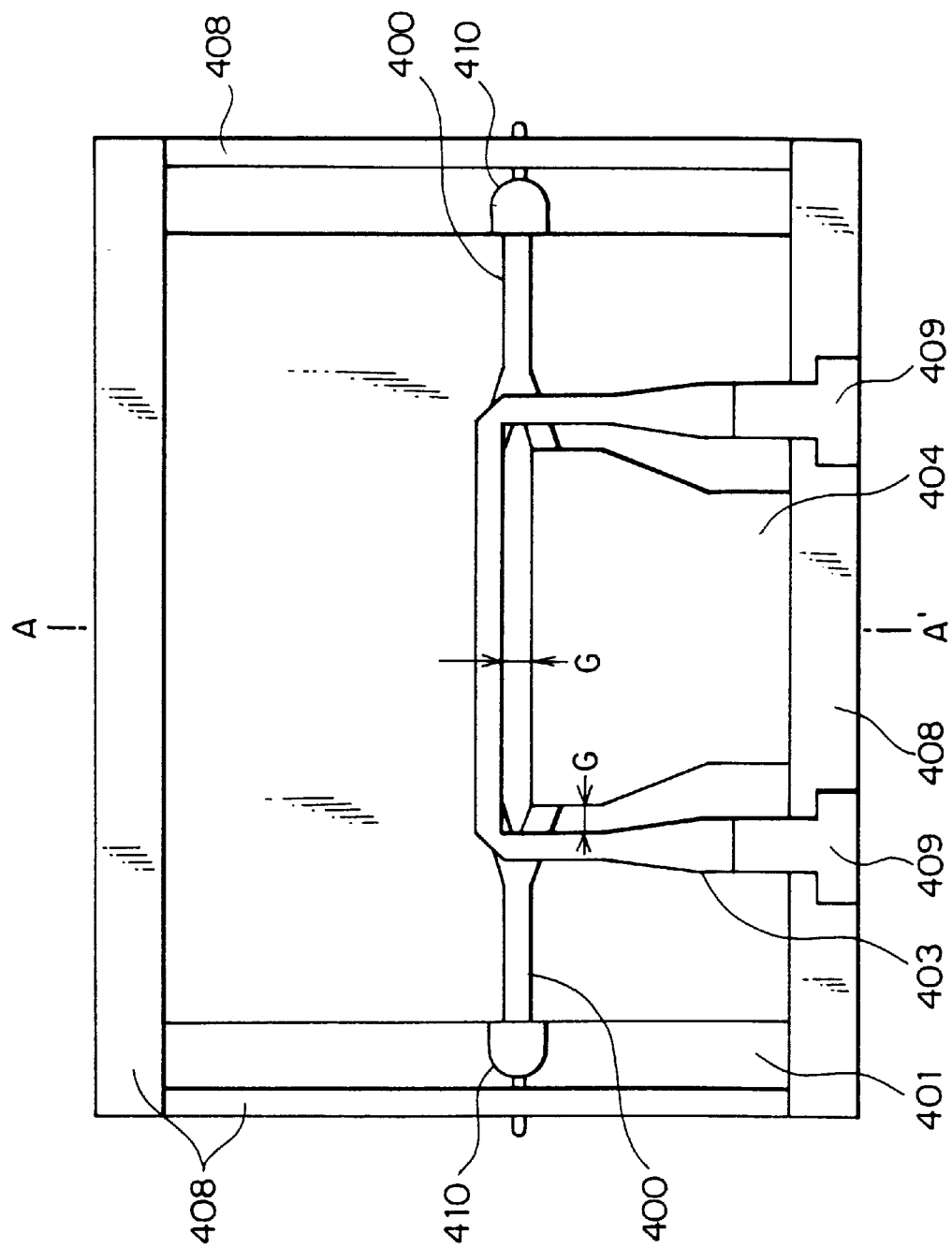
FIG. 23 is a plan view showing an optical waveguide type device according to an twelfth embodiment.
Figure 24:
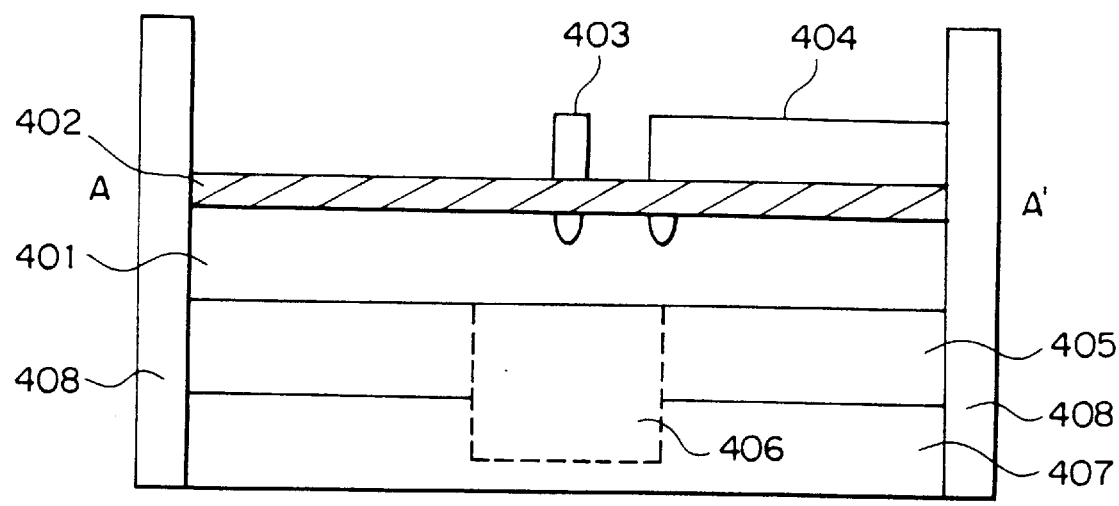
FIG. 24 is a cross sectional view showing the optical waveguide type device in FIG. 23, taken along A–A' line in FIG. 23.
Figure 25:
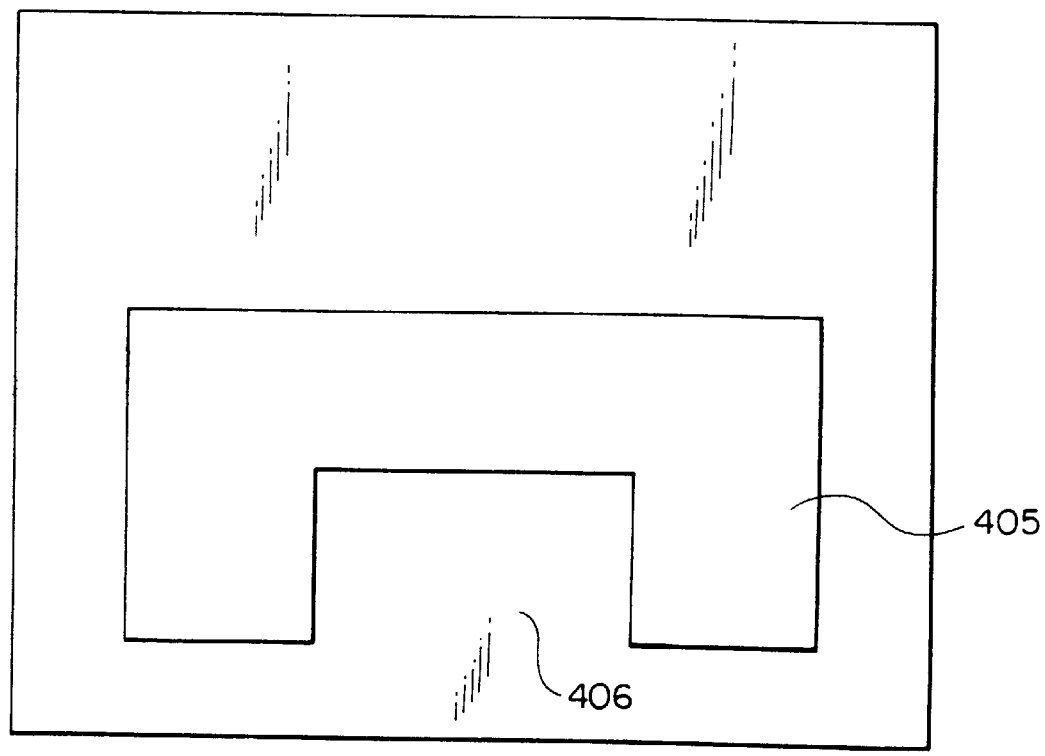
FIG. 25 shows a dielectric substrate having a groove in FIG. 24.

Referring to FIGS. 23 to 25, an optical waveguide type device according to a twelfth embodiment of this invention will be described below.

The twelfth is similar to the tenth embodiment except for configuration of a electrode.

An optical waveguide 400 is formed in a crystal substrate 401. The optical waveguide 400 comprises a light input terminal and a light output terminal, as shown in FIG. 4. Further, the optical wave guide 400 is branched into two paths at an intermediate portion. The intermediate portion functions as a phase shifter portion, as shown in FIG. 4.

A buffer layer 402 is entirely formed on the crystal substrate 401, as shown in FIG. 24. In the twelfth embodiment, an asymmetric strip line (ASL) or an asymmetric coplanar strip (ACPS) type electrode structure is formed on the buffer layer 402 different from the tenth embodiment. The ASL or ACPS type electrode structure has one signal electrode 403 and one ground electrode 404. In this event, the signal electrode 403 has the width (W) of 5–20 μm, the length (L) of 10–70 mm and the thickness 3–40 μm, while the ground electrode 404 has the width(W) of 100–9000 μm, the length (L) of 10–70 mm and the thickness 3–40 μm. The gap G between the signal electrode 403 and the ground electrode 404 is selected so that the value of W/G falls within the range between 1 and 0.1 (namely, G=–200 μm).

The crystal substrate 401 is arranged on a dielectric substrate 405, as shown in FIG. 24. In addition, a metal substrate 407 is disposed under the dielectric substrate 405. A groove 406 is formed in the dielectric substrate 405 and the metal substrate 407 under at least the signal electrode 403 and between at least the signal electrode 403 and the ground electrode 404, as shown in FIGS. 24 and 25.

Further, a connector 409 is attached to the signal electrode 403. A microwave signals are given to the signal electrode 403 via the connector 409. Fiber mounts 410 are attached to the both sides (the light input terminal and the light output terminal) of the optical waveguide 400. The light goes in and out of the optical waveguide 400 via the fiber mounts 410.

What is claimed is:

1. An optical waveguide type device comprising:
a first substrate having an electro-optical effect;
an optical waveguide formed in said first substrate;
a buffer layer formed on said first substrate to cover said optical waveguide;
a signal electrode formed on the buffer layer and over said optical waveguide, microwave signals being given to said signal electrode;
a second substrate formed under said first substrate; and
a groove being formed in the second substrate and below only said signal electrode.

2. The device as claimed in claim 1, wherein said first substrate comprises a crystal substrate of LiNbO$_3$.

3. The device as claimed in claim 1, wherein said optical waveguide is formed by a titanium metal.

4. The device as claimed in claim 1, wherein said buffer layer is formed by a dielectric material.

5. The device as claimed in claim 1, wherein said second substrate is formed by a dielectric material.

6. The device as claimed in claim 1, wherein said groove functions as an air gap for reducing an attenuation of the microwave signals.

7. An optical waveguide type device comprising:
a first substrate having an electro-optical effect;
an optical waveguide formed in said first substrate;
a buffer layer formed on said first substrate to cover said optical waveguide;
a coplanar waveguide electrode having one signal electrode and two ground electrodes formed on the buffer layer, microwave signals being given to said signal electrode;
a second substrate formed under said first substrate; and
a groove being formed in the second substrate below said signal electrode and between said two ground electrodes.

8. A device as claimed in claim 7, further comprising:
a third substrate formed under said second substrate; and
a groove being formed in the third substrate below said signal electrode and between said two ground electrodes.

9. An optical waveguide type device comprising:
a first substrate having an electro-optical effect;
an optical waveguide formed in said first substrate;
a buffer layer formed on said first substrate to cover said optical waveguide;
an asymmetric coplanar strip electrode having one signal electrode and one ground electrode formed on the buffer layer, microwave signals being given to said signal electrode;
a second substrate formed under said first substrate; and
a groove being formed in the second substrate below said signal electrode and between said two ground electrodes.

10. A device as claimed in claim 9, further comprising:
a third substrate formed under said second substrate; and
a groove being formed in the third substrate below said signal electrode and between said two ground electrodes.

11. An optical waveguide type device comprising:
a substrate having an electro-optical effect;
an optical waveguide formed in said substrate;
a buffer layer formed on said substrate to cover said optical waveguide;
a signal electrode formed on the buffer layer, said signal electrode having an active portion over said optical waveguide and a feeder portion at an end portion thereof, said active portion having a first width and said feeder portion having a second width; and a connector connected to said feeder portion to supply microwave signals to said signal electrode, said connector having a third width, the second width being wider than the first width and being narrower than the third width.

12. A device as claimed in claim 11, wherein said feeder portion is formed in a taper form.

13. A device as claimed in claim 11, wherein said active portion has a bending portion and is electrically connected to said feeder portion via said bending portion.

14. A device as claimed in claim 13, wherein said bending portion is formed in a circular form.

15. An optical waveguide type device comprising:

a substrate having an electro-optical effect;

an optical waveguide formed in said substrate;

a buffer layer formed on said substrate to cover said optical waveguide;

a coplanar waveguide electrode having one signal electrode and two ground electrodes formed on the buffer layer, said signal electrode having an active portion over said optical waveguide and a feeder portion at an end portion thereof, said active portion having a first width and said feeder portion having a second width; and a connector connected to said feeder portion to supply microwave signals to said signal electrode, said connector having a third width, the second width being wider than the first width and being narrower than the third width.

16. An optical waveguide type device comprising:

a substrate having an electro-optical effect;

an optical waveguide formed in said substrate;

a buffer layer formed on said substrate to cover said optical waveguide;

a coplanar waveguide electrode having one signal electrode and two ground electrodes formed on the buffer layer, said signal electrode having an active portion over said optical waveguide and a feeder portion at an end portion thereof, said active portion having a first width and said feeder portion having a second width;

a connector connected to said feeder portion to supply microwave signals to said signal electrode, said connector having a third width, the second width being wider than the first width and being narrower than the third width; and a fourth width is specified between said two ground electrodes and at an end portion thereof, and the third width is narrower than the fourth width.

17. An optical waveguide type device comprising:

a substrate having an electro-optical effect;

an optical waveguide formed in said substrate;

a buffer layer formed on said substrate to cover said optical waveguide;

an asymmetric coplanar strip electrode having one signal electrode and one ground electrode formed on the buffer layer, said signal electrode having an active portion over said optical waveguide and a feeder portion at an end portion thereof, said active portion having a first width and said feeder portion having a second width; and a connector connected to said feeder portion to supply microwave signals to said signal electrode, said connector having a third width, the second width being wider than the first width and narrower than the third width.

* * * * *